United States Patent [19]

Beckwith, Jr. et al.

[11] Patent Number: 4,682,160
[45] Date of Patent: Jul. 21, 1987

[54] REAL TIME PERSPECTIVE DISPLAY EMPLOYING DIGITAL MAP GENERATOR

[75] Inventors: Paul B. Beckwith, Jr., Indialantic; Donald S. Bistarkey, Palm Bay, both of Fla.

[73] Assignee: Harris Corporation, Melbourne, Fla.

[21] Appl. No.: 517,037

[22] Filed: Jul. 25, 1983

[51] Int. Cl.$^4$ .............................................. G09G 1/16
[52] U.S. Cl. .................................. 340/729; 340/750; 340/727; 340/747; 340/728
[58] Field of Search ............... 340/728, 729, 723, 724, 340/725, 726, 727, 731, 747

[56] References Cited

U.S. PATENT DOCUMENTS

| 2,921,124 | 1/1960 | Graham | 340/728 |
| 3,454,822 | 7/1969 | Harrison, III | 340/729 |
| 4,442,495 | 4/1984 | Sukonick | 340/726 |

FOREIGN PATENT DOCUMENTS

| WO79/00830 | 10/1979 | World Int. Prop. O. |
| 1520452 | 8/1978 | United Kingdom . |
| 2061074 | 5/1981 | United Kingdom . |
| 2100098 | 12/1982 | United Kingdom . |

OTHER PUBLICATIONS

*Rural Scene Perspective Transformations*, Devich SPIE vol. 303 Visual Simulation & Image Realism II pp. 54–66.

*Display Technology for Digital Map Information*, Moon. *The Perspective Representation of Functions of Two Variables* Kubert et al; JACM Apr. 1968; Reprinted in Interactive Computer Graphics, IEEE Cat. No. EH0156-0 pp. 272–283.

*Primary Examiner*—Marshall M. Curtis
*Attorney, Agent, or Firm*—Antonelli, Terry & Wands

[57] ABSTRACT

A system for generating a real time perspective view of the terrain lying along an aircraft's flight path accesses terrain data stored in a digital map generator and converts the data into a perspective representation of the terrain on the face of a suitable display such as a cockpit instrument panel CRT. The stored map data that is accessed provides, in real time, information pertaining to elevation features of the terrain over which the aircraft is flying, so that upon conversion to a perspective presentation to the pilot, there is provided a real time perspective image of the contours of the terrain as though the pilot were looking out a windscreen at the terrain in high visibility conditions. The invention also is capable of providing perspective scene rotation and translation (corresponding to roll and pitch of the aircraft).

62 Claims, 27 Drawing Figures

BRIGHTNESS CALCULATION

PERSPECTIVE BLOCK DIAGRAM

ANGLE PROCESSOR

PIXEL ADDRESS CALCULATION

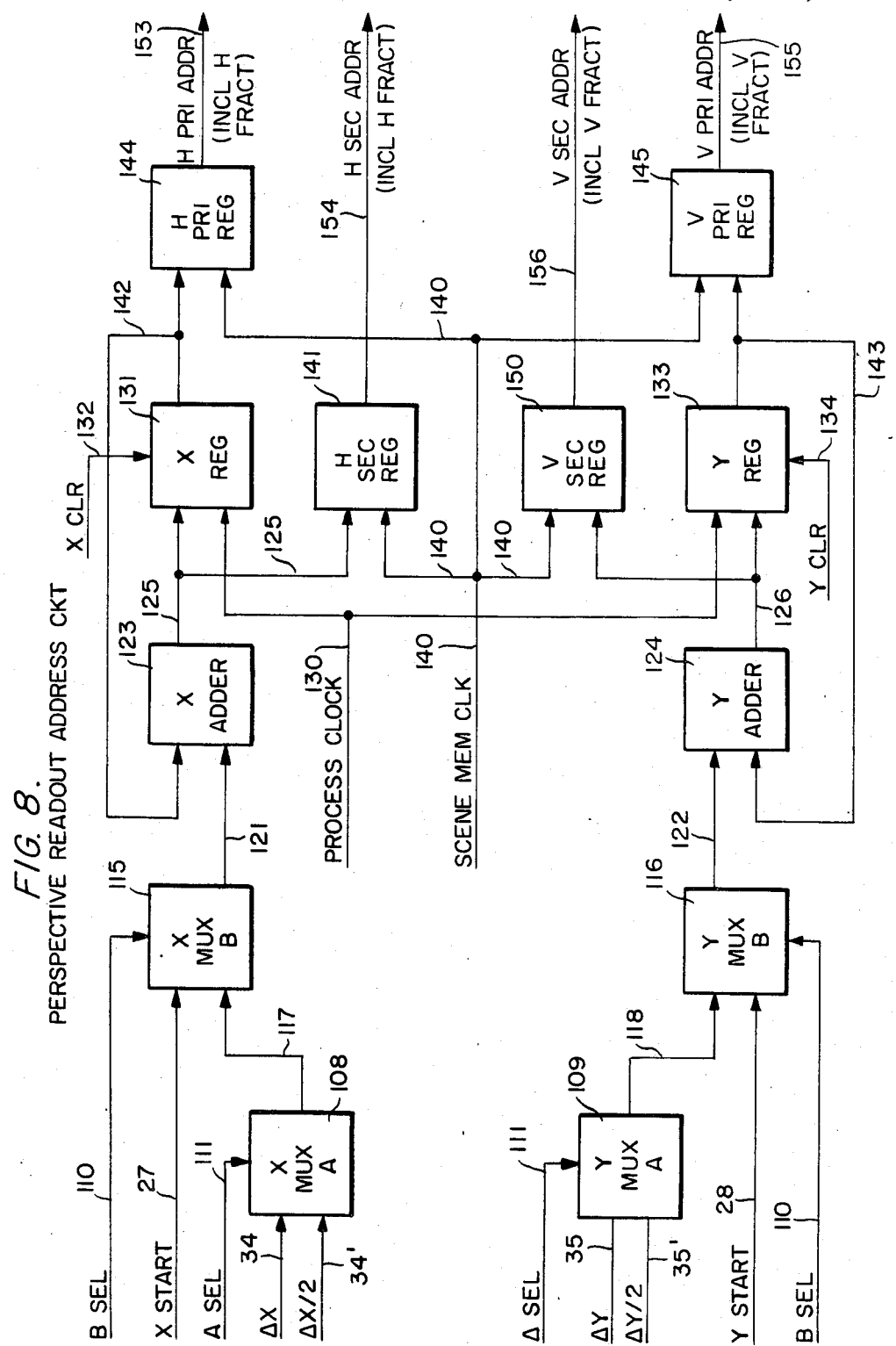
FIG. 8. PERSPECTIVE READOUT ADDRESS CKT

ELEVATION INTERPOLATOR

LINE BUFFER

WRITE ADDRESS

READ ADDRESS

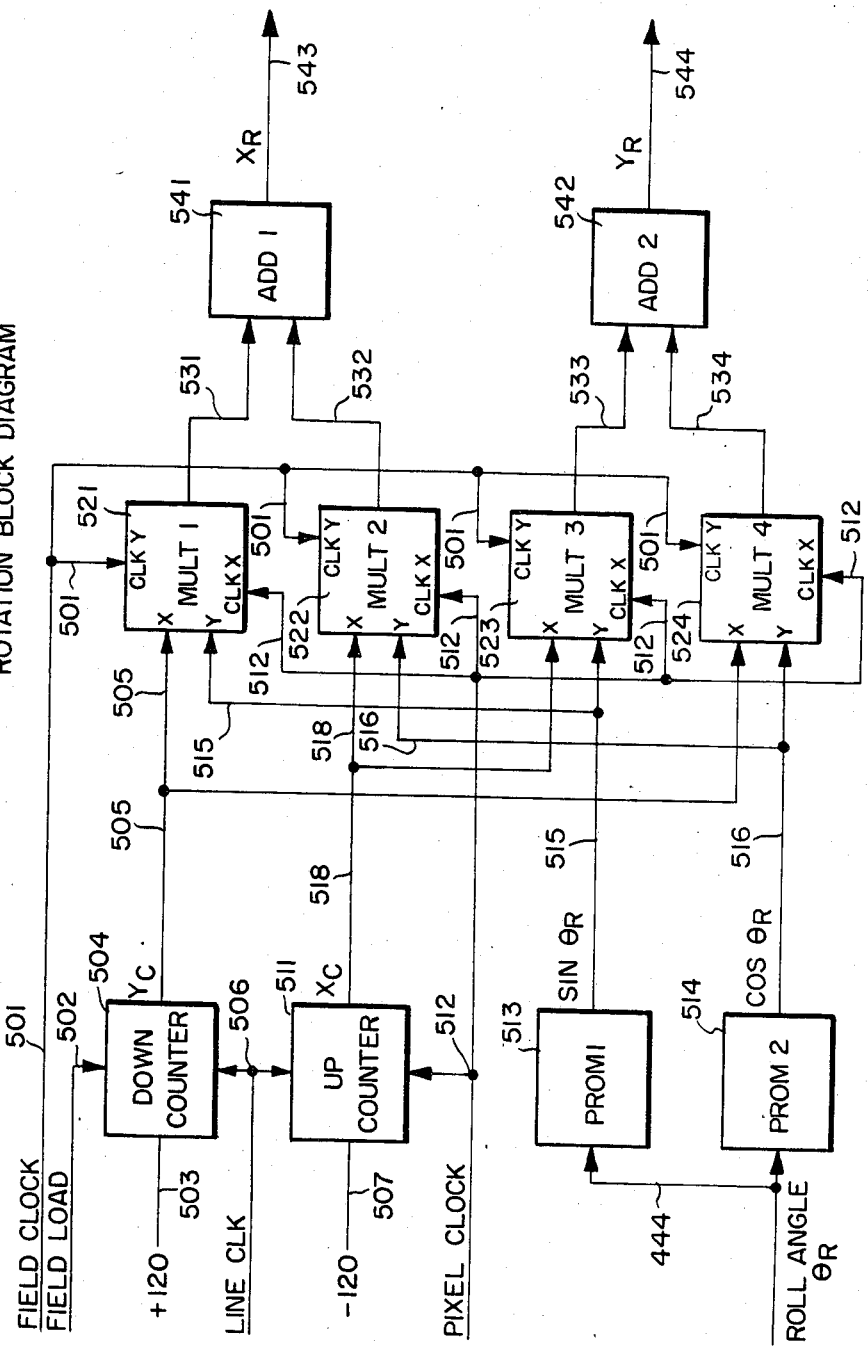

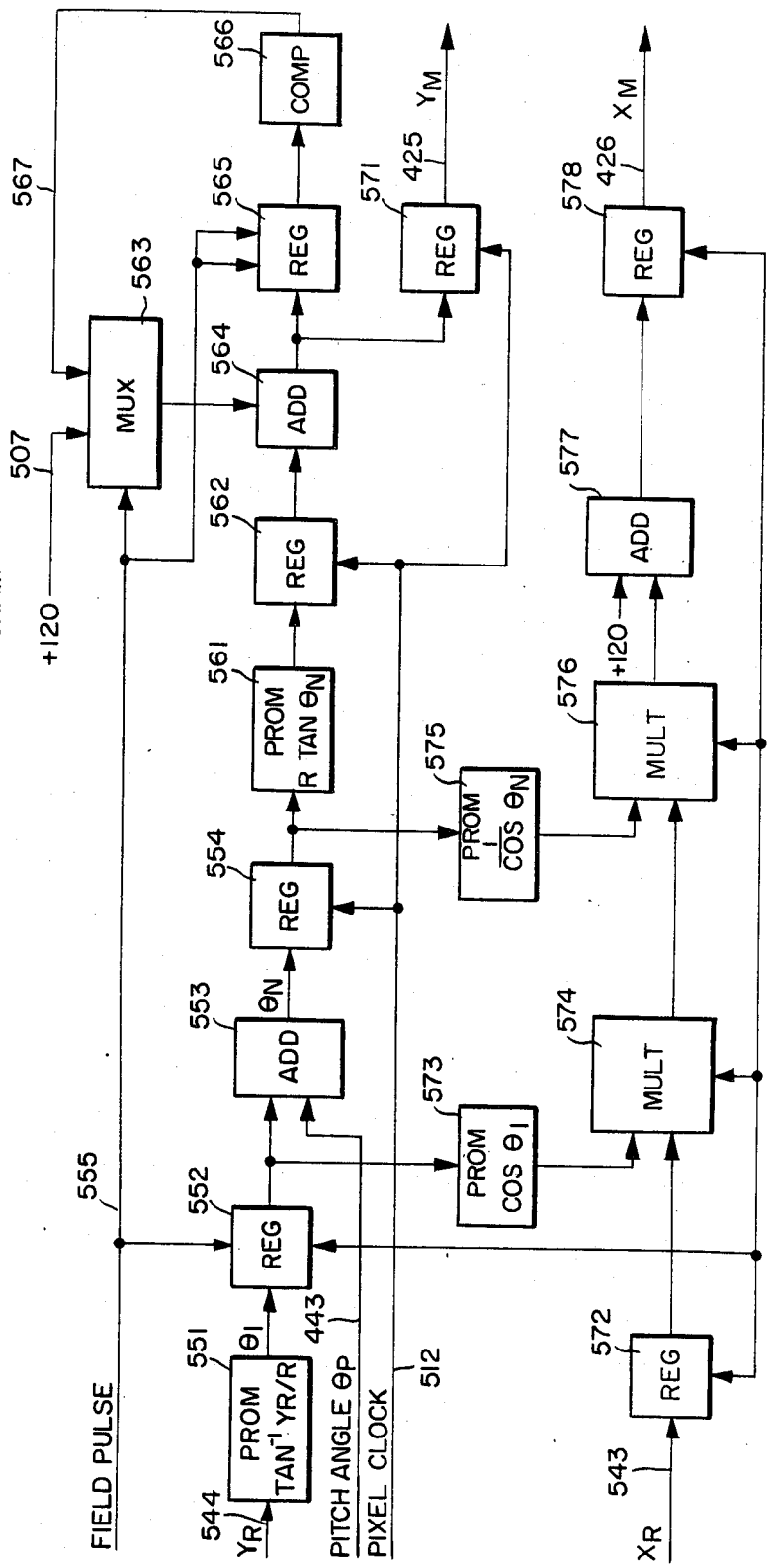
FIG. 23. PITCH BLOCK DIAGRAM

FIG. 24.

| PIXEL CLOCK UNIT | PROM 551 OUT | REG 552 | ADD 553 OUT | REG 554 | PROM 561 OUT | ADD 564 INPUTS | | | ADD 564 OUTPUT REG 571 |
|---|---|---|---|---|---|---|---|---|---|
| | | | | | | REG 562 | COMP 566 | | |
| 1 | X | X | X | X | X | X | $-R\,TAN\,\theta_P+120$ | | X |
| 2 | $TAN^{-1}\frac{YR(1)}{R}$ | $\theta_I(1)$ | $\theta_P+\theta_I(1)$ | X | X | X | $-R\,TAN\,\theta_P+120$ | | X |
| 3 | $TAN^{-1}\frac{YR(2)}{R}$ | $\theta_I(2)$ | $\theta_P+\theta_I(2)$ | $\theta_N(1)$ | $R\,TAN\,\theta_N(1)$ | X | $-R\,TAN\,\theta_P+120$ | | X |
| 4 | $TAN^{-1}\frac{YR(3)}{R}$ | $\theta_I(3)$ | $\theta_P+\theta_I(3)$ | $\theta_N(2)$ | $R\,TAN\,\theta_N(2)$ | X | $-R\,TAN\,\theta_P+120$ | | X |
| 5 | $TAN^{-1}\frac{YR(4)}{R}$ | $\theta_I(4)$ | $\theta_P+\theta_I(4)$ | $\theta_N(3)$ | $R\,TAN\,\theta_N(3)$ | $R\,TAN\,\theta_N(1)$ | $-R\,TAN\,\theta_P+120$ | | $R\,TAN\,\theta_N(1)-R\,TAN\,\theta_P+120$ |
| 6 | $TAN^{-1}\frac{YR(5)}{R}$ | $\theta_I(5)$ | $\theta_P+\theta_I(5)$ | $\theta_N(4)$ | $R\,TAN\,\theta_N(4)$ | $R\,TAN\,\theta_N(2)$ | $-R\,TAN\,\theta_P+120$ | | $R\,TAN\,\theta_N(2)-R\,TAN\,\theta_P+120$ |
| 7 | $TAN^{-1}\frac{YR(6)}{R}$ | $\theta_I(6)$ | $\theta_P+\theta_I(6)$ | $\theta_N(5)$ | $R\,TAN\,\theta_N(5)$ | $R\,TAN\,\theta_N(3)$ | $-R\,TAN\,\theta_P+120$ | | $R\,TAN\,\theta_N(3)-R\,TAN\,\theta_P+120$ |
| 8 | $TAN^{-1}\frac{YR(7)}{R}$ | $\theta_I(7)$ | $\theta_P+\theta_I(7)$ | $\theta_N(6)$ | $R\,TAN\,\theta_N(6)$ | $R\,TAN\,\theta_N(4)$ | $-R\,TAN\,\theta_P+120$ | | $R\,TAN\,\theta_N(4)-R\,TAN\,\theta_P+120$ |
| 9 | $TAN^{-1}\frac{YR(8)}{R}$ | $\theta_I(8)$ | $\theta_P+\theta_I(8)$ | $\theta_N(7)$ | $R\,TAN\,\theta_N(7)$ | $R\,TAN\,\theta_N(5)$ | $-R\,TAN\,\theta_P+120$ | | $R\,TAN\,\theta_N(5)-R\,TAN\,\theta_P+120$ |
| | $TAN^{-1}\frac{YR(9)}{R}$ | $\theta_I(9)$ | $\theta_P+\theta_I(9)$ | $\theta_N(8)$ | $R\,TAN\,\theta_N(8)$ | $R\,TAN\,\theta_N(6)$ | $-R\,TAN\,\theta_P+120$ | | $R\,TAN\,\theta_N(6)-R\,TAN\,\theta_P+120$ |

TABLE I  $\quad Y_M = R\,TAN(\theta_P+\theta_I)-R\,TAN\,\theta_P+120$

FIG. 25.

| PIXEL CLOCK UNIT | MULT 576 INPUTS | | MULT 514 INPUTS | | ADD 577 INPUTS | | REG 578 |
|---|---|---|---|---|---|---|---|
| | REG 572 X | PROM 573 Y | MULT 574 OUT X | PROM 575 Y | MULT 576 OUT A | +120 B | |
| 1 | XR1 | COS $\theta_I(1)$ | X | X | X | X | X |
| 2 | XR2 | COS $\theta_I(2)$ | XR1 COS $\theta_I(1)$ | $\frac{1}{COS \theta_N(1)}$ | X | X | X |
| 3 | XR3 | COS $\theta_I(3)$ | XR2 COS $\theta_I(2)$ | $\frac{1}{COS \theta_N(2)}$ | $\frac{XR1\ COS\ \theta_I(1)}{COS\ \theta_N(1)}$ | +120 | X |
| 4 | XR4 | COS $\theta_I(4)$ | XR3 COS $\theta_I(3)$ | $\frac{1}{COS \theta_N(3)}$ | $\frac{XR2\ COS\ \theta_I(2)}{COS\ \theta_N(2)}$ | +120 | XR(1) COS $\theta_I(1)$/COS $\theta_N(1)$+120 |
| 5 | XR5 | COS $\theta_I(5)$ | XR4 COS $\theta_I(4)$ | $\frac{1}{COS \theta_N(4)}$ | $\frac{XR3\ COS\ \theta_I(3)}{COS\ \theta_N(3)}$ | +120 | XR(2) COS $\theta_I(2)$/COS $\theta_N(2)$+120 |
| 6 | XR6 | COS $\theta_I(6)$ | XR5 COS $\theta_I(5)$ | $\frac{1}{COS \theta_N(5)}$ | $\frac{XR4\ COS\ \theta_I(4)}{COS\ \theta_N(4)}$ | +120 | XR(3) COS $\theta_I(3)$/COS $\theta_N(3)$+120 |

TABLE 2      $X_M = \frac{XR\ COS\ \theta_I}{COS\ \theta_N}$

REAL TIME PERSPECTIVE DISPLAY EMPLOYING DIGITAL MAP GENERATOR

FIELD OF THE INVENTION

The present invention relates in general to information display systems and, more particularly, to a digital system for processing digital map data representative of the terrain over which a vehicle such as an aircraft is passing, or simulation thereof, and the generation therefrom of a perspective display of the terrain to the pilot.

BACKGROUND OF THE INVENTION

In the navigation of aircraft over a prescribed route, contour maps have been conventionally employed to provide an indication of the terrain over which the aircraft is flying. This information, together with instrument readings and visual observation of the terrain from the cockpit, enables the pilot to determine altitude and course of the aircraft as it travels along its flight path. For low altitude flying, such as might be experienced in a helicopter, an instantaneous picture of the details of the terrain over which the aircraft is flying is of paramount importance in guiding the aircraft, especially where the contour of the terrain changes rapidly and contains obstacles to the flight of the aircraft.

In copending application Ser. No. 641,179, filed Aug. 15, 1984, which is a continuation of copending application Ser. No. 224,742, filed Jan. 13, 1981, now abandoned, by Paul B. Beckwith, Jr. entitled "Digital Map Generator and Display System", assigned to the assignee of the present application, there is described a system for effecting the dynamic display of terrain data which is stored in digital format and which may be viewed on a cockpit cathode ray tube display in the form of a moving map of the terrain over which the aircraft is flying, offering the pilot an advanced navigational tool not previously provided by conventional terrain mapping schemes.

The system described in that application operates so as to automatically orient the moving map, under the control of the aircraft's navigational computer system, to the instantaneous position of the aircraft with a heading-up disposition. Within this system there is employed a scene memory which stores terrain data and which is selectively accessed to generate the map display. The stored terrain data encompasses a number of definitive aspects of the terrain including, inter alia, both elevation and cultural information, so that the system is capable of providing a maximum of information to assist the pilot in navigating and controlling the aircraft.

Now, although the generation of a plan view map of the terrain over which the aircraft is flying greatly assists the pilot, he still relies on as many information sources as possible, including instrument readings and his own view from the cockpit. Unfortunately, in restricted visibility conditions, such as nighttime flying, poor weather, smoke, etc. the pilot's view of what lies ahead of the aircraft may provide very little, if any, information. Ideally, the pilot would prefer to always see the terrain ahead of the aircraft as it appears in daylight, high visibility conditions.

SUMMARY OF THE INVENTION

In accordance with the present invention the need of the pilot to be provided with an image of the terrain showing the contours that he would normally expect to see from the cockpit in clear daylight flying conditions is satisfied by a system that is capable of generating a real time perspective view of the terrain lying along the aircraft flight path, regardless of conditions of visibility outside the aircraft. To this end, the system according to the present invention is comprised of a simplified hardware scheme that accesses terrain data stored in a digital map generator, such as that stored in the scene memory employed in the system detailed in the above-identified copending application, and converts this data into a perspective representation of the terrain on the face of a suitable display such as a cockpit instrument panel CRT. The stored map data that is accessed provides, in real time, information pertaining to elevation features of the terrain over which the aircraft is flying, so that upon conversion to a perspective presentation to the pilot, there is provided a real time perspective image of the contours of the terrain as though the pilot were looking out a windscreen at the terrain in high visibility conditions.

In accordance with a basic embodiment of the present invention, full resolution of a selected field of view (45° or 90°) using only a line buffer display storage scheme is accomplished by translating a perspective ray or line of observation of the terrain map in the plan view into a corresponding vertical line of the flat screen of the CRT on which the perspective presentation of the terrain is generated. From an observer's view point (the pilot as he views the terrain beneath and ahead of the aircraft on the display screen) a plurality of observation lines fan out on the terrain map plan view to define the field of view to be imaged. Projecting these lines onto the vertical display screen (e.g. CRT face plate) generates a corresponding plurality of parallel vertical lines. Through a simple trigonometric conversion, elevation data for successively addressed points on each observation line in the plan view terrain map stored in the scene memory are translated into pixel locations on the vertical lines on the display. In addition, this elevation data is used to determine the slope of the terrain being imaged.

On the basis of this slope data and stored artificial sun angle information that is accessed in accordance with the heading of the aircraft, various levels of shading for the terrain contour are generated and supplied as brightness value data to the pixels of the display, the addresses of which are determined by elevation data of the successively scanned lines of the observer/pilot's field of view. Because the data to be supplied to the display pixels is extracted on a line-by-line basis (field-of-view fan lines-to-vertical lines on the pixel display) only a simple line buffer ping-pong scheme is required for carrying out the presentation of pixel data to the display. As normal CRT screen beam scanning is horizontal across the target faceplate, a simple 90° rotation of the display accomplishes alignment of the CRT sweep lines with the data as written in and read-out of the line buffers.

Rather than rotate the CRT 90°, a conventional ping-pong field screen memory may be employed in place of the line buffer to store the pixel data in its original parallel vertical lines format, which data is subsequently read out at right angles (horizontally) so as to be aligned with the horizontal scan lines of the cockpit CRT display.

As a further feature of the invention perspective scene rotation (corresponding to roll of the aircraft) and vertical screen shift (corresponding to a change in pitch of the aircraft) may be provided by reading out a subset of the output screen memory of the ping-pong screen memory pair described above. In accordance with this embodiment of the invention, the vertical ping-pong screen memory perspective view data is read out so as to allow for real time rotation and vertical shift of the perspective view. This enables the display to present to the pilot a perspective view of the terrain in accordance with the roll and pitch attitude of the aircraft from the basic vertical screen perspective conversion scheme.

In accordance with still another feature of the invention, where the projection (display) screen geometry is not flat (e.g. a dome as on the inside of a canopy) a read out address scheme may be mapped to complement the nonlinearities of the screen projecting geometry, so that the described scene is imaged on the screen without distortion (e.g. dome pin cushion distortion). The distortion correction pattern may be stored in a ROM and addressed on a pixel-by-pixel basis. Such dome correction may be employed for either the basic embodiment of the invention providing normal perspective display, or it may be used with the perspective rotation scheme mentioned above.

BRIEF DESCRIPTION OF THE DRAWINGS

FIG. 8 is a detailed schematic block diagram of perspective read out address circuit 33 of the system diagram of FIG. 6;

FIG. 22 is a schematic block diagram of roll correction circuitry for reading out data from the screen memories in accordance with the roll attitude of the aircraft;

FIG. 23 is a schematic block diagram of pitch correction circuitry for controlling the accessing of data from the screen memories in accordance with the pitch of the aircraft;

FIGS. 24 and 25 depict respective tables I and II for explaining the operation of the vertical (Y) and horizontal (X) correction circuit components of the pitch correction circuitry of FIG. 23.

DETAILED DESCRIPTION

Figure 1:
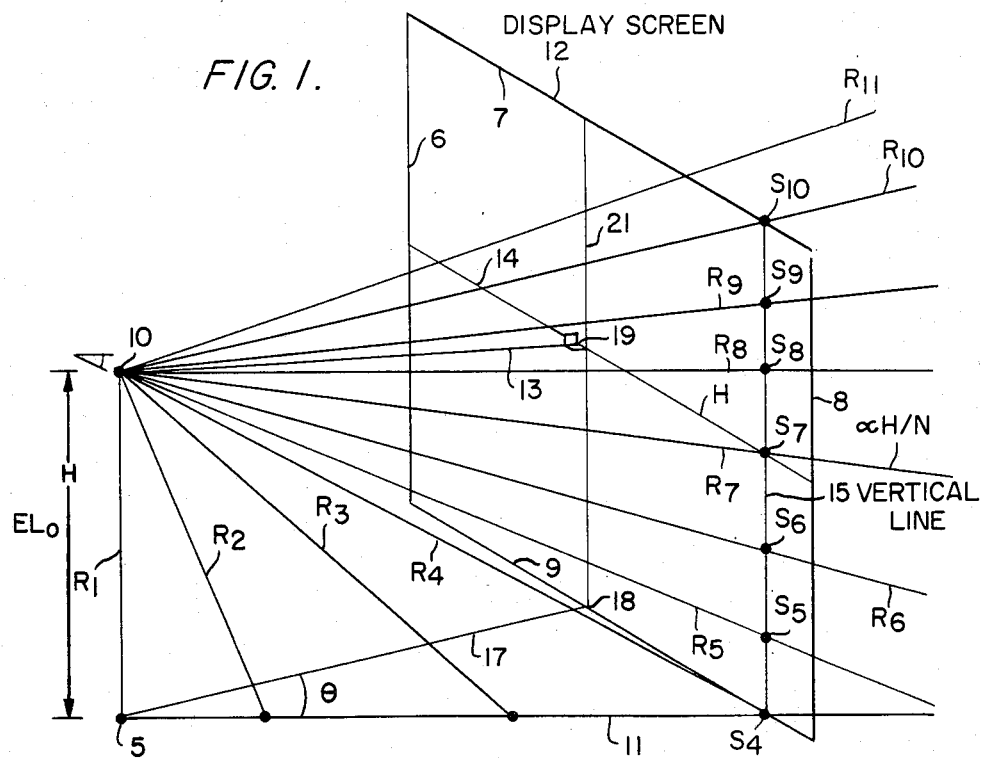
FIG. 1 is an isometric graph illustrating the projection of lines of observation from an observer to a display screen plane.

As mentioned previously, pursuant to the present invention, respective rays or lines of observation from the pilot/observer along the terrain beneath and ahead of the aircraft translate into a plurality of vertical lines on a display screen which intersects the rays or lines of observation from the observer. This is illustrated in the three dimensional view in FIG. 1 and in the plan view of FIG. 1A wherein the point of observation 10 of an observer is located some elevation or height H above a plane containing a line 11 of observation that extends from a point 5 directly beneath the observer 10 and continues ahead of the observer, intersecting a vertical plane (screen) 12 at a point S4 and continuing along line 11 beyond the screen 12. Screen 12 may be of a substantially rectangular or square shape having sides 6, 7, 8 and 9. A ray of observation from the observer 10 straight down from the observer to point 5 on the line 11 is denoted by ray line R1. Additional rays R2, R3 . . . R11 are shown as emanating from the observer at point 10 and extending out ahead of the observer but lying in a common plane with line 11 and ray R1.

From the point of observation of the observer at 10, a line 13 intersects the screen at the center thereof at point 19, perpendicular to the plane of the screen 12. A line 14, which is parallel to the top edge 7 and the bottom edge 9 of the screen, may be considered to be coincident with the infinite horizon seen by the observer at 10. Line 13 is perpendicular to this line 14 at point 19.

Figure 1A:
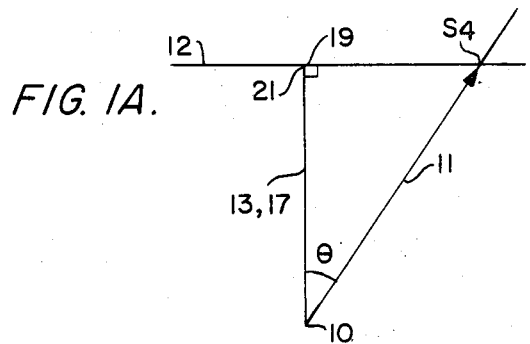
FIG. 1A is a plan view of a portion of the isometric graphic illustration of FIG. 1.

As mentioned above, line 11 follows a path of observation along rays R1, R2, R3 . . . from a point 5 directly beneath the observer and extending out ahead of the observer. In the illustration of FIG. 1, the first ray from the observer that falls on that line 11 and intersects screen 12 as one proceeds out from the observer is ray R4, which intersects the screen at point S4 at the bottom edge of screen 12. It is to be observed that observation line 11 is rotated or displaced by some angle $\theta$ relative to a line 17 which is parallel to line 13, and perpendicularly intersects the screen 12 at point 18.

Additionally shown rays of observation R5, R6, R7, R8, and R10 are coincident with the plane containing ray R4 and line 11 and each of these rays intersects screen 12 along a vertical line 15 at points S5, S6, S7, S8, S9, and S10. Point S10 denotes the upper edge point of vertical line 15 at edge 7 of screen 12. Within this grouping, ray R7 intersects the infinite horizon line 14 at point S7 and it lies in a plane containing infinite horizon line 14 and the straight-ahead observation line 13, mentioned previously.

It is to be noted that the rays of observation shown (Ra ... R11) are simply for purposes of illustration and obviously do not encompass all of the rays of observation that exist, since there are an infinite number of such rays which translate into points defining the vertical line 15 on screen 12. For rays of observation that track line 17 from the observer 10, which is perpendicular to the screen, there is created a corresponding vertical line 21 that is straight ahead of the observer, assuming that the observer is positioned so that the screen is symmetric with respect to his point of observation.

In accordance with the present invention, the above-described geometric relationship between lines of observation from an observer disposed in front of the screen and fanning out over a terrain profile ahead of the observer, and their corresponding vertical lines of observation on the screen, is used to locate or identify pixels on a display screen along the respective vertical lines into which elevation points of the terrain profile intersected by lines of observation translate.

Figure 2:
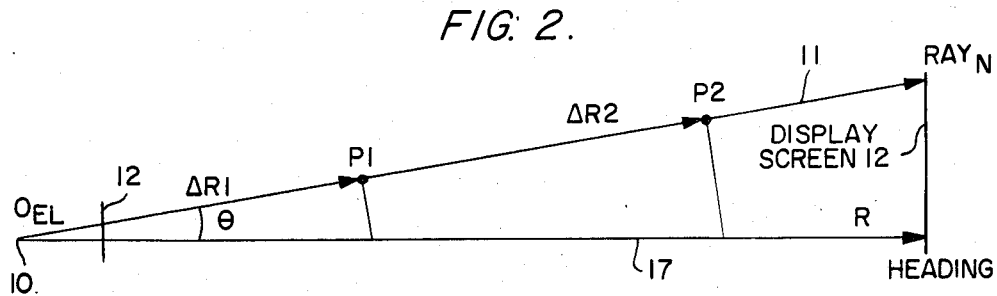
FIG. 2 is a further plan view of selected rays of observation of the graphic illustration of FIG. 1.
Figure 3:
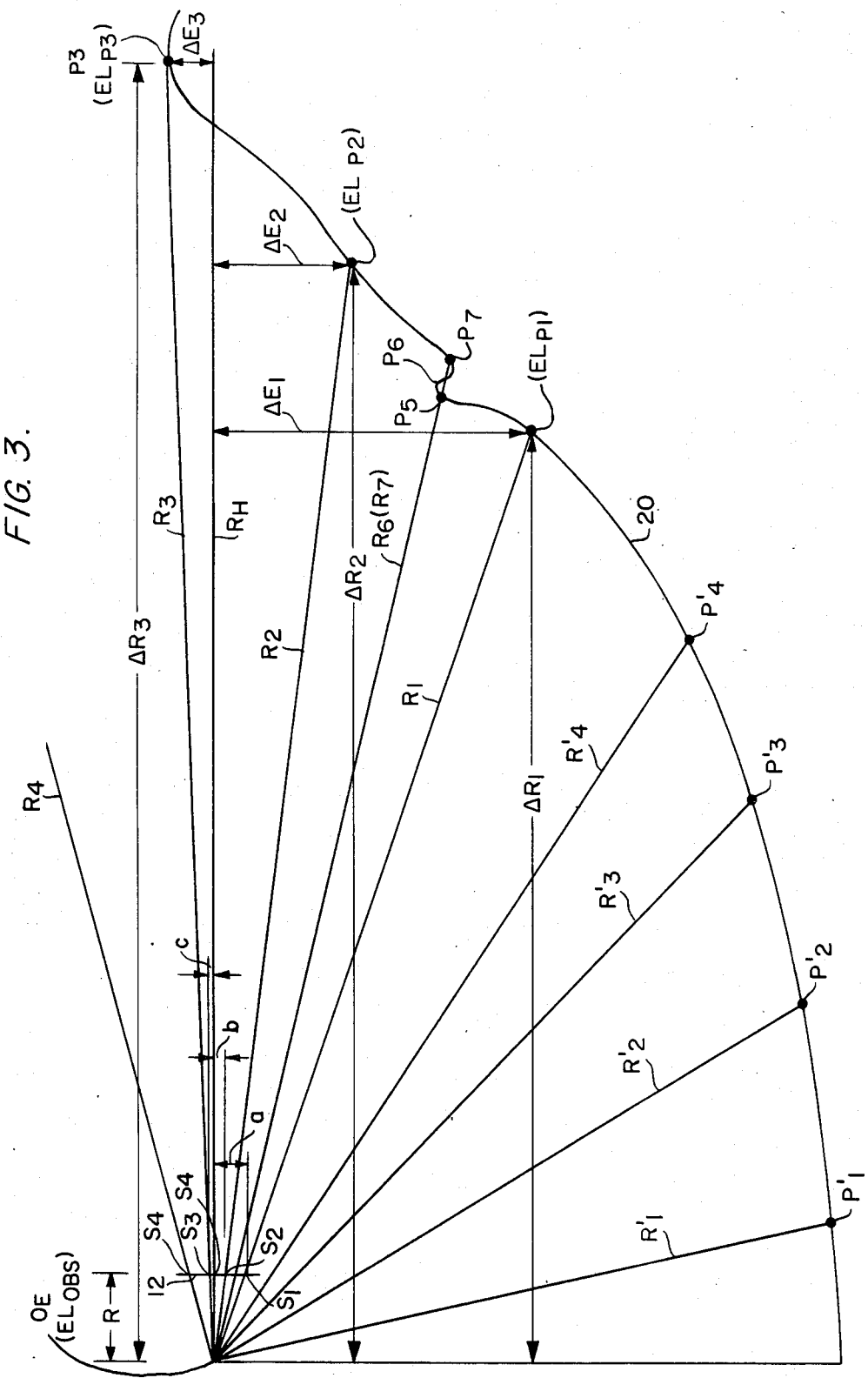
FIG. 3 is a side view of a graph illustrating the projection of lines of observation from an observer through a display screen onto a terrain profile.

To facilitate an understanding of this concept, attention is directed to FIGS. 2 and 3 which show, on an exaggerated scale, respective plan and side views of the above-mentioned point 10 of observation of the observer relative to a terrain 20 that lies ahead of him, the observer looking to the right of point 10 as viewed in each of the figures. Also shown is the disposition of display screen 12 in front of the pilot observer in an aircraft having a heading along line 17. For rays of observation that extend ahead of the observer/pilot, such as along line 11 that is disposed at some angle $\theta$ relative to the heading angle of line 17, there exists an infinite number of rays of observation which intersect the terrain 20. A number of these rays of observation are specifically identified in FIG. 3, e.g. ray $R_1$ which intersects the terrain 20 at the point P1, and rays such as rays $R_2$, $R_3$ and RH.

Disposed at some distance R in front of the observer is the display screen 12 which is shown as being perpendicular to the direction of heading of the aircraft along the infinite horizon ray $R_H$ (which coincides with ray 13 shown in FIG. 1). An examination of the above-mentioned ray $R_1$ through the point P1 where it intersects the terrain 20 reveals that the ray intersects the screen 12 at point S1, which, in the illustration shown in FIG. 3, is at the bottom edge of the screen. Additional rays R2 and R3 are shown as extending from the point of the observer 10 and intersecting the terrain at points P2 and P3, respectively, and the screen 12 at points S2 and S3, respectively. A ray $R_4$ is shown as passing over the entirety of the terrain profile and intersecting the upper edge 8 of the screen 12 at a top point S4. Each of the rays $R_1$, $R_2$, $R_3$ and $R_4$ lies along the observation line 11, namely at some angle $\theta$ relative to the heading of the aircraft along line 17. As a result, each of these rays is coplanar with one another and creates at its respective intersection of the screen 12 a series of points S1, S2, S3, S4 that form a vertical line in the plane of the screen, as described above with reference to FIGS. 1 and 1A.

As pointed out above, in FIG. 3 line 20 represents the terrain ahead of the observer. If, instead of actually being able to see the terrain ahead of him, the observer is supplied with information representative of points of elevation of that terrain profile 20 and geographically related to the point of observation 10 of the observer, then it is possible to create on screen 12 a perspective image of what the observer would see if he was actually viewing the terrain. It is this data conversion and perspective generation capability of the present invention which offers the above-described simplified scheme of creating for the pilot observer a perspective image of the terrain ahead of him from a stored digital map of elevation points for that terrain.

More specifically, and again referring to FIGS. 2 and 3, line 20, while representing the terrain, may also be considered to represent a contour path formed by a series of elevation points in a plane containing an observation ray or line 11 and the observer at point 10. From the observer's point of view 10 and extending along line $R_H$, which is perpendicular to the screen 12, successive distance measurements may be determined. In FIG. 3, it is seen that for point P1 on terrain 20, which is displaced from point 10 by a distance $\Delta R_1$ along infinite horizon line RH (line $R_H$ being perpendicular to screen 12), there is a differential in elevation $\Delta E_1$ between the observer ($EL_{OBS}$) at location 10, and the elevation of the terrain 20 at point $P_1$ ($EL_{P1}$). (A line from the observer passing through point $P_1$ along ray $R_1$ intersects the base of the screen at point S1, as noted previously.) At a further distance $\Delta R_2$ along line RH from the observer 10, the difference in elevation of the terrain (here at point $P_2$) relative to the elevation of the observer at point 10 is $\Delta E_2$. (A ray of observation which intersects this point $P_2$ along line $R_2$ intersects the screen 12 at point $S_2$.) Similarly, at an even further distance $\Delta R_3$ along line RH from the observer 10, the difference in elevation of the terrain relative to the observer (here at point $P_3$) is $\Delta E_3$. (A ray from the observer $R_3$ which intersects the point $P_3$ intersects the screen 12 at point $S_3$.)

According to the present invention, each point of intersection ($S_i$) on screen 12 of the respective rays of observation $R_i$ that extend from the observer at point 10 along lines of observation, such as line 11, may be identified by a simple trigonometric relationship. Letting the value "a" denote the distance between the intersection of the infinite horizon line $R_H$ which perpendicularly intersects the screen 12 at point $S_H$, then for point $P_1$, there exists the relationship $a/R = \Delta E_1/\Delta R_1$ or $a = R \Delta E_1/\Delta R_1$. For point $P_2$, there is the relationship $b/R = \Delta E_2/\Delta R_1$ or $b = R \Delta E_2/\Delta R_2$. Finally, for point $P_3$, the intersection of point of ray $R_3$ may be determined from the relationship $c/R = \Delta E_3/\Delta R_3$ or $c = R \Delta E_3/\Delta R_3$.

In other words, the separation distances "a", "b" and "c" of image points (pixel locations), that would be seen by the observer on the screen 12 if he were viewing points P1, P2 and P3 on the terrain profile directly ahead and beneath him, may be recreated from data which simply identifies the location of the observer relative to the screen and the terrain (as by way of navigational information and a map of stored elevational values). Since, as described previously, there are available systems (such as that described in the above copending patent application) which provide for digital storage of elevation terrain data, it is possible, in accordance with the present invention, to take advantage of such systems and generate a perspective image of the terrain by simply knowing the location of the observer 10 and the screen 12 relative to the geographical positions from which the terrain map data was obtained.

Figure 4:
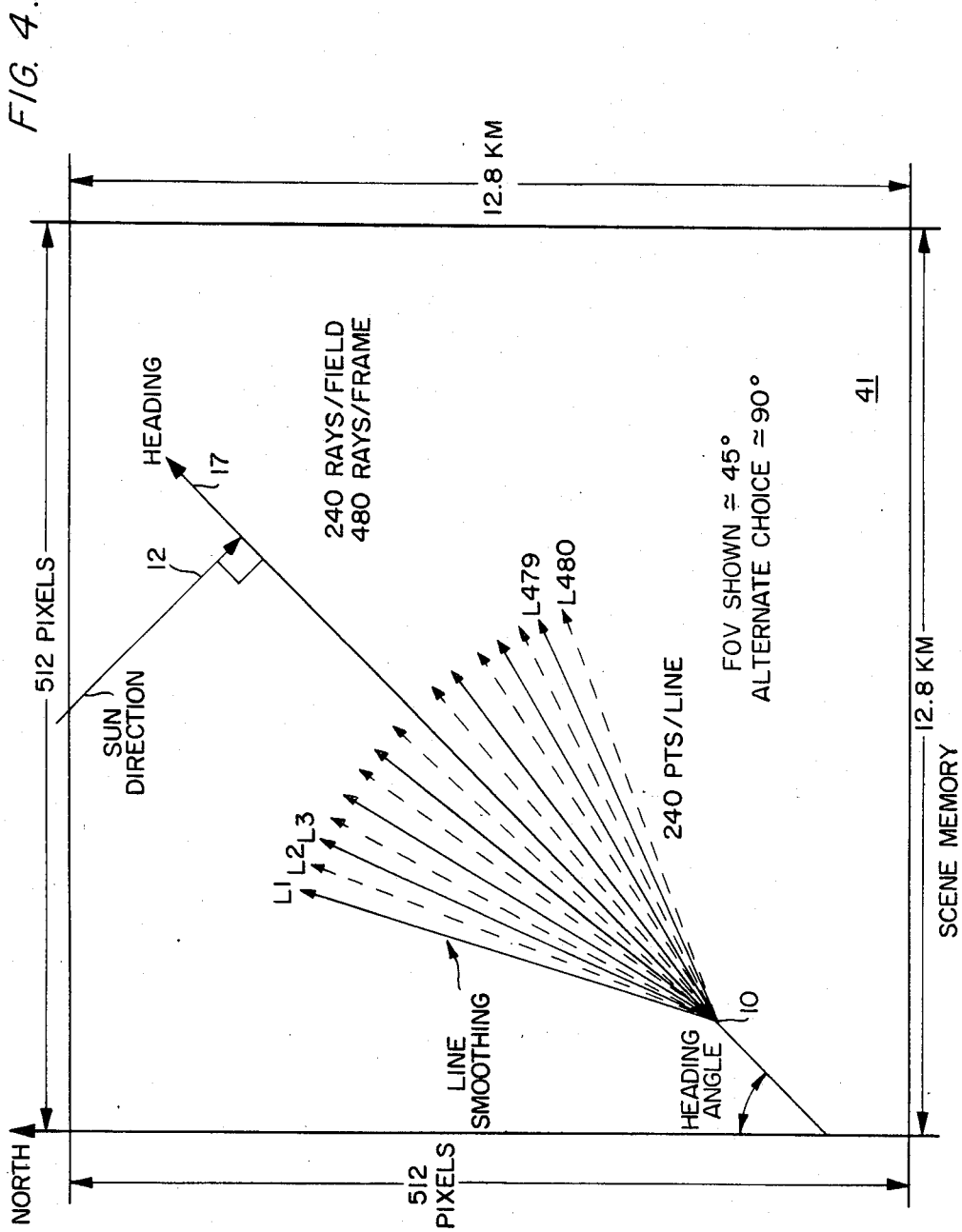
FIG. 4 shows a representation of stored digital terrain map data with a field of view overlay showing a fan of lines of observation from an observer's point of observation.

FIG. 4 illustrates a representation of digital terrain map data, as stored in a scene memory described in the above-mentioned copending application, that may be used for generating a plan view of the data on a cockpit display screen. It is to be recalled, however, that the image to be generated in accordance with the present invention is a perspective view of this data; FIG. 4 is provided simply to illustrate how the map data stored in the scene memory may be represented in terms of position of the observer and heading of the aircraft.

As described previously, and as is explained in detail in the above-mentioned copending application, within the digital map generator there may be employed a scene memory which includes, for each memory location, data values of the height or elevation of the points that make up the map. In the scene memory map representation of FIG. 4, which may correspond to a 12.8 Km × 12.8 Km area, there is shown the point of observation 10 of the pilot/observer and the direction or heading of the aircraft along a line 17. Line S, which is perpendicular to the heading of the aircraft, represents the direction of an artificial sun or shading source relative to the heading of the aircraft. For purposes of generating shading in the generated perspective image, the artificial sun direction is always established to be perpendicular to the heading of the aircraft.

From the observer at point 10, there extend a plurality of observation lines which fan out on either side of the line of heading of the aircraft and prescribe the field of view of the observer. These are identified in FIG. 4 as lines L1, L2 ... L480, which prescribe a field of view of 45° from the observer 10, $22\frac{1}{2}°$ counterclockwise to and $22\frac{1}{2}°$ clockwise to heading 17. The 45° field of view shown in FIG. 4 is simply for purposes of explaining a practical embodiment and, of course, neither this angle nor the number of observation lines described here is considered to be limitative. Moreover, for purposes of illustrating a variation in the field of view, it will be assumed that there are two available fields of view: the 45° field shown in FIG. 4, and a 90° field (not shown in FIG. 4).

Figure 5:
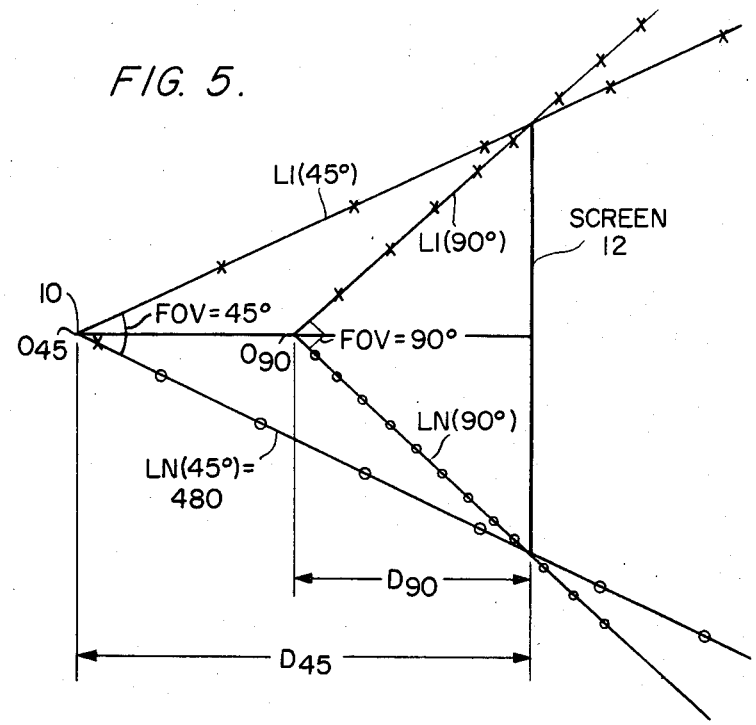
FIG. 5 is a plan view of a pair of fields of view that may emanate from an observer's point of observation on a stored terrain data map and intersect a prescribed image screen plane.

These two fields of view are shown diagrammatically in FIG. 5, wherein the point of observation of the observer $O_{45}$ relative to the image screen 12 upon which the perspective display is to be presented is separated from the screen by a distance ($R=D_{45}$) and bounded by lines L1 ... LN (which here may equal the number 480 for purposes of providing an illustration of a practical embodiment). The field of view may be expanded to 90°, in which case the point of the observer $O_{90}$ is closer to the screen (separation distance $R=D_{90}$). As can be seen from FIG. 5, where the field of view is increased, (e.g. 45° to 90°) the lines of observation are, of course, spread out over a greater angle. Since the spacing of the translated vertical lines on the screen 12 is determined by the spacing of the pixels of which the screen is comprised, then, for a fixed number of pixels it can be seen that increasing the field of view means that the spacing between lines of observation must be increased; namely, the angle between the respective adjacent lines must be increased. The impact of this spacing will be more clearly understood from the subsequent description from the angle processing portion of the system.

As is shown in FIG. 4, along each line of observation Li there are assumed to be 240 points of elevation measurement. (E.G. for Line L1 there are points $P1_{L1}$ ... $P240_{L1}$). These points represent locations or distances along each line Li from the point of the observer 10 to some point Pi at which an elevation value Elpi from the digital terrain map may be derived and from which elevation value and distance to that point from the observer 10 and screen 12 the above-described translation illustrated in FIGS. 2 and 3 may be accomplished.

It is also to be observed from FIG. 4 that for adjacent odd and even lines, the data elevation points that are to be extracted are offset from one another by half the spacing between points along a selected line, so as to provide a smoothing/interlacing of the image that is to be generated on the screen from which the perspective view is presented to the observer. Namely points $P1_1$ ... $P1_{240}$ of Line L1 (shown as "x"s) are offset by half the distance between two consecutive points relative to the spacing of points $P2_1$ ... $P2_{240'}$ in line L1 (shown as dots).

Figure 6:
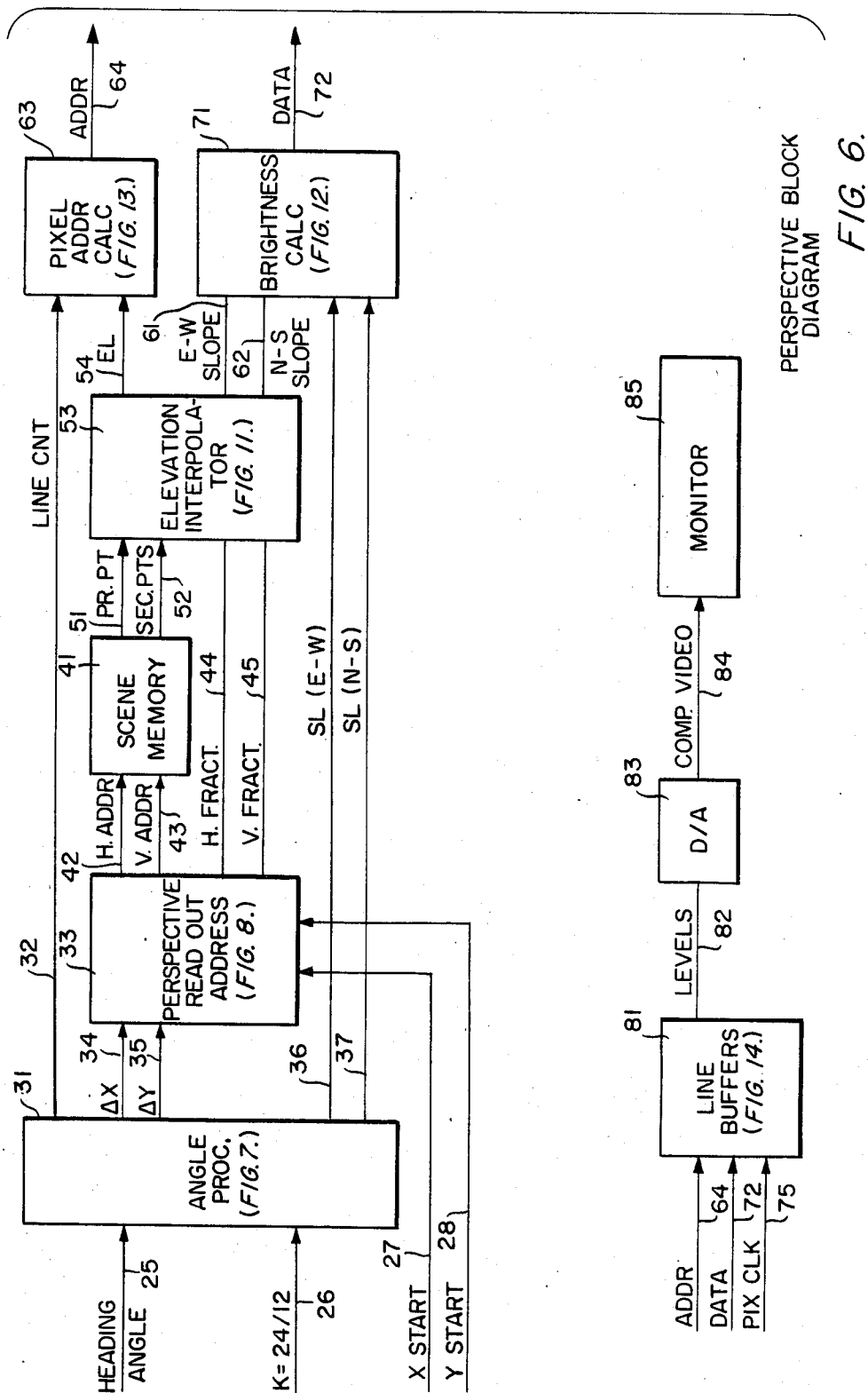
FIG. 6 is a schematic block diagram of a real time perspective display system according to the present invention.
Figure 11:
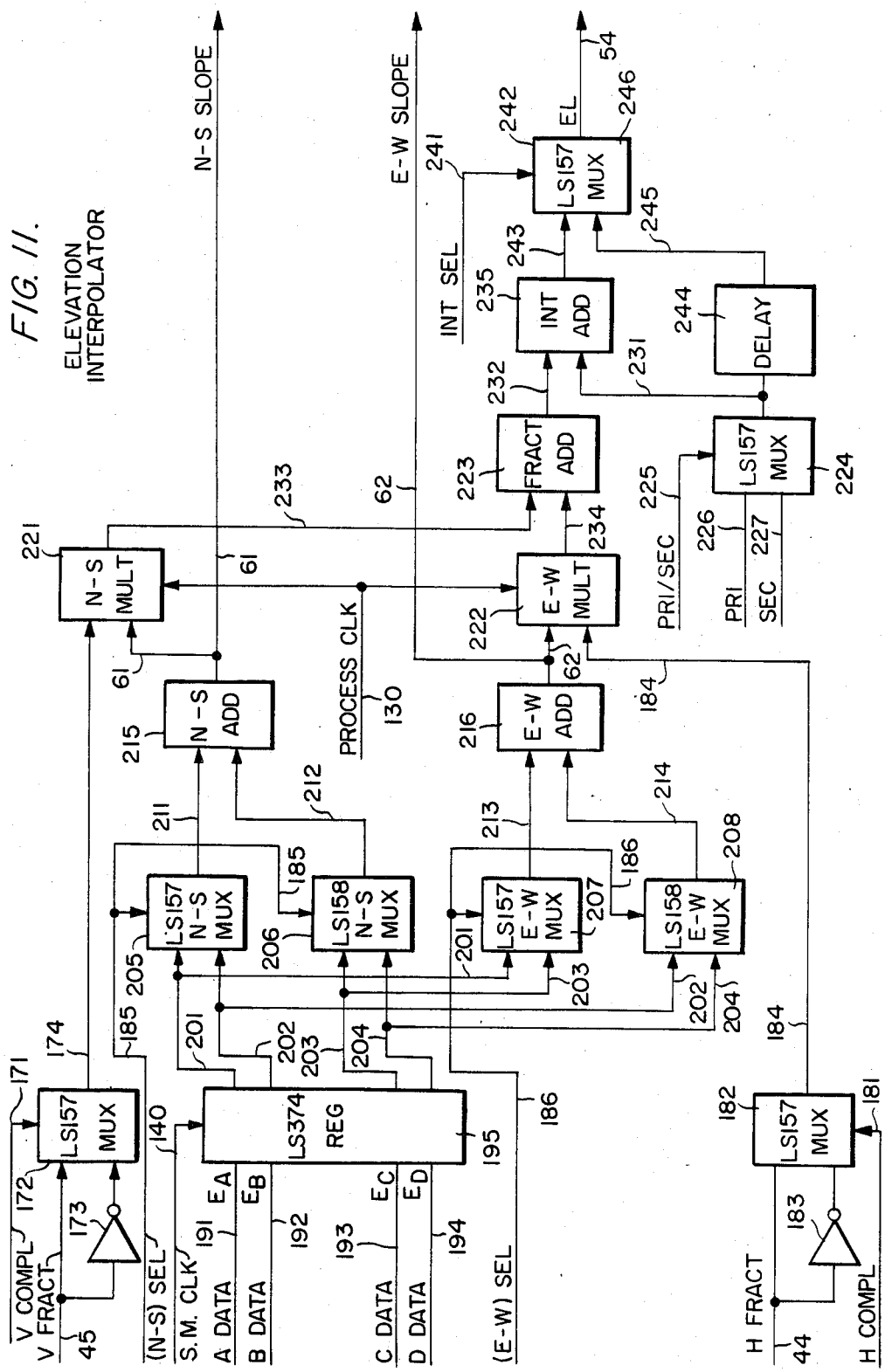
FIG. 11 is a detailed diagram of the components making up the elevation interpolator circuitry 53 of FIG. 6.

Referring now to FIG. 6, there is shown a schematic block diagram of the real time perspective display according to the present invention. This system includes an angle processor 31 (to be described in detail below with reference to FIG. 7) which receives data relating to the heading angle of the aircraft over input link 25 and a field of view coefficient (12 or 24) over input link 26. From these two pieces of information, angle processor 31 generates signals which represent the successive lines that define the field of view (as shown in FIGS. 4 and 5 discussed above) as well as artificial sun angle information which depends upon the heading of the aircraft, as noted previously. Each particular scan line Li is identified by a line count signal supplied over line 32 to a pixel address calculation circuit 63 (the details of which are described below with reference to FIG. 13). Respective orthogonal increments ($\Delta X$, $\Delta Y$, wherein Y represents north-up and X east-right) that define the slope of each respective line in the plane of the map are provided over links 34 and 35 to a perspective read out address circuit 33 (to be described in detail below with reference to FIG. 8). The sun angle information (east-west and north-south values) are supplied over respective links 36 and 37 to a brightness calculation circuit 71 (FIG. 11, described infra). These sun angle values are employed to provide shading depending upon the slope of the terrain and thereby produce pixel intensity signals for the respective pixels that lie along the translated vertical lines of observation on the respective display screen.

Input links 27 and 28 to the perspective read out address circuit 33 identify, in terms of the data stored in the scene memory 41 (as shown in FIG. 4, for example), the starting point of each line ($X_S$, $Y_S$), namely the point of observation of the observer relative to the terrain within the map data stored in the scene memory. Using these start values ($X_S$, $Y_S$) as well as the increment values $\Delta X$ and $\Delta Y$, perspective readout address circuit 33 produces two sets of signals. The first set of signals is supplied over links 42 and 43 and represents horizontal and vertical address signals (vertical identifying the north-up position data in the scene memory) for locating the elevation sample points Pi along the respective lines Li of the field of view fan within the scene memory 41 (as shown in FIG. 4, described above). In response to these signals, the scene memory produces a set of four elevation values (corresponding to a single primary point, and three secondary points offset from the primary point as will be described below with reference to FIG. 11) to be coupled to an elevation interpolator 53 (shown in greater detail in FIG. 10, to be described below). The elevation interpolator 53 is also coupled to links 44 and 45 which provide, from the perspective read out circuit 33, fractional values for accurately locating, within the terrain map, the above-referenced primary and secondary points, in conjunction with the data values extracted from the scene memory 41.

The elevation interpolator 53 provides, over link 54, elevation values for these primary and secondary points and supplies them to pixel address calculation circuit 63. In response to the line count value on link 32 and the elevation values on link 54, pixel address calculation circuit 63 identifies the address of a pixel on the display screen 12, that lies along a vertical line translated from a respective observation ray from the observer, and which effectively intersects a point on the terrain lying along that observation line which is to be recreated on the observer's display screen 12.

Elevation interpolator 53 also supplies respective east-west and north-south slope values on links 61 and 62 for the elevation data points extracted from the scene memory 41 in accordance with the information from the perspective read out address circuit 33, in order to provide shading or intensity level information to brightness calculation circuit 71. Brightness calculation circuit 71, as noted previously, produces a signal on output link 72 representative of the intensity of the respective pixel on the cockpit display screen identified in accordance with the address information produced on link 64 in the pixel address calculation circuit 63. Each of these address and data signals is coupled to a set of line buffers 81 (shown in greater detail in FIG. 14, to be discussed below). This information, as well as a pixel clock signal provided over link 75, is employed by the line buffers 81 to respectively write a vertical line of pixel information on the observer's display screen while another line of information is being loaded into a line buffer. The line buffers are coupled over link 82 through a D/A converter 83 and then over link 84 to the scanning circuits of the display. As a conventional CRT rastor scan sweeps the electron beam horizontally across the screen, the CRT itself may be rotated 90°, so that the respective vertical lines that are to be recreated on the perspective screen are properly oriented for presentation to the pilot/observer.

Figure 7:
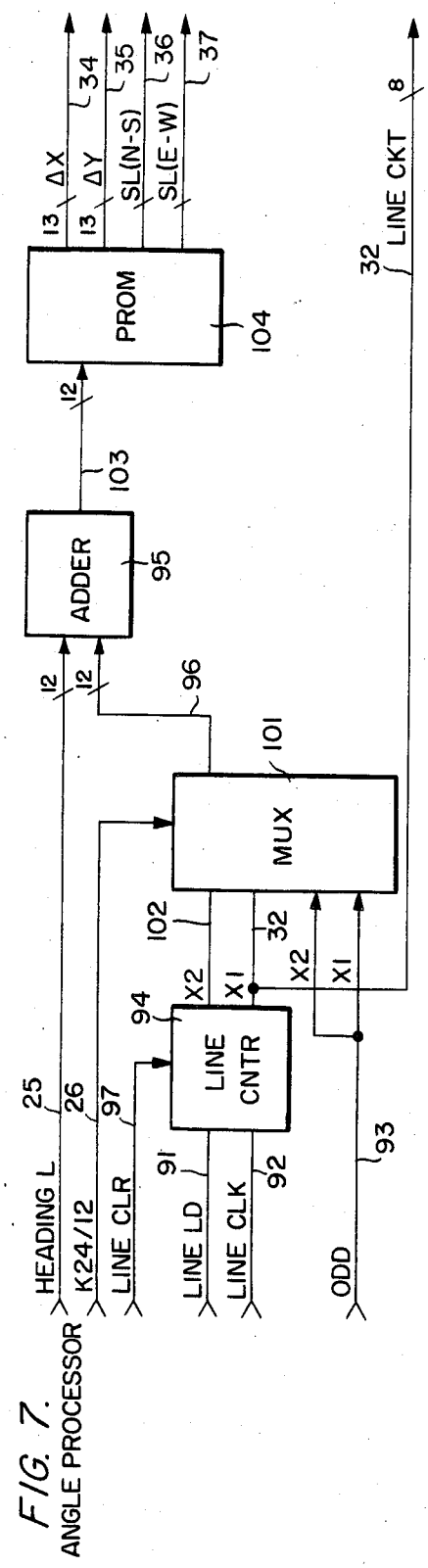
FIG. 7 is a detailed schematic block diagram of angle processor 31 of the system diagram of FIG. 6.

Referring now to FIG. 7, the details of the angle processor 31 of FIG. 6 will be described. As mentioned previously, the angle processor responds to information from the aircraft's navigation unit representative of the heading of the aircraft and a field of view coefficient input to produce signals identifying the respective lines of the field of view, namely which line of interest is being processed and the incremental ($\Delta X$, $\Delta Y$) values by way of which that line is defined. The heading information is coupled to the angle processor over line 25 and it is supplied as one input of an adder 95. The field of view coefficient (K) is coupled over line 26 to a multiplexer 101. This coefficient may be settable by the observer pilot in the cockpit simply by flipping a switch which provides one of two digitally hardwired values. These values are shown as representative of the numbers $K=24$ and $K=12$, in order to provide proper numerical conversion values for the number of lines employed. As shown in FIG. 4, a 45° field of view may contain 480 lines. A 90° field of view will also contain 480 lines but the spacing between adjacent lines will be increased (doubled). Namely, for a 90° field of view, the spacing between adjacent lines is twice that of a 45° field of view (as diagrammatically shown in FIG. 5, described above). This relationship will become more clear from the explanation of the operation of the system to follow.

The angle processor also includes a line counter 94 which has a line clear input link 97, a line load input 91 and a line clock input 92. These inputs are supplied by a suitable processor or timing control circuit, the details of which are not necessary for an understanding of the operation of the present invention and will not be described here. The line counter provides a pair of outputs on links 102 and 32, link 32 providing a line count value, identifying which of the lines of the field of view is being processed, while link 102 supplies a value corresponding to twice that line count. These links are employed for the respective 45° and 90° fields of view one of which is selected by and provided to the pilot/observer. Multiplexer 101 also has a pair of inputs coupled to a link 93 which is a binary bit identifying whether or not the field of interest is an odd field or an even field. The output of multiplexer 101 is coupled over link 96 to be added in adder 95 to data on line 25 representative of the heading angle 25 to produce a value over link 103 representative of the angle of the line of interest relative to north-up within the scene memory. Link 103 addresses a PROM 104 which provides four output signals over links 34–37. The first pair of signals on links 34 and 35, respectively, represents the incremental values ($\Delta X$, $\Delta Y$) in horizontal and vertical directions relative to the north-up orientation of the data in the scene memory for a respective line of interest, which permits successive stored elevation values for points along that line to be accessed from the scene memory. The second pair of values supplied over lines 36 and 37 represents the direction of the artificial sun along line 12 which is perpendicular to heading angle 17 as shown in FIG. 4. The sun direction is expressed in terms of a north-south (vertical) component and an east-west (horizontal) component relative to the north-up position of the data in the scene memory.

In operation, the angle processor initially provides sun angle information from PROM 104 to brightness calculation circuit 71 based upon the heading angle coupled over link 25. This is accomplished by clearing the line counter 94 and setting the binary state of odd input line 93 to a zero so that the output of multiplexer 96, regardless of which input is selected, is all zeroes. Thus, the heading angle supplied over link 25 when added to the zero output of the multiplexer in adder 95 is coupled over link 103 to PROM 104. In response to the heading angle data, PROM 104 supplies sun angle vertical and horizontal component values over links 36 and 37, respectively, to the brightness calculation circuit 71. These values are obtained by cosine and sine values stored in PROM 104 so as to provide east-west (horizontal) and north-south (vertical) values representative of the components that form the artificial sun direction line S as shown in FIG. 4.

Once these values are stored in brightness calculation circuit 71, the scanning of the successive lines of a field of view frame commences. For purposes of the present description, it will be assumed that the field of view is 45° as shown in FIG. 4, so that the input to multiplexer 101 over link 26 corresponds to a selection of coefficient K=24. This means that multiplexer 101 will select the X1 input links 32 and 93. The line clear input over link 97 to line counter 94 is removed and line counter 94 is loaded by way of link 91 with the value (−240), (corresponding to the position of line L1 as shown in FIGS. 4 and 5). Also, the binary state of line 93 is set to a "1" so as to force the least significant bit of multiplexer 101 to represent an odd line (here the first line L1). This value is translated at the output from multiplexer 101 into a multibit word that is compatible with the multibit word of heading angle 25 (for example each being a 12 bit word) and represents the effective angle of line L1 relative to north-up, as shown in FIG. 4. PROM 104 responds to this multibit word by identifying the angle of line L1 and produces, on output links 34 and 35, respective $\Delta X$ and $\Delta Y$ values (namely horizontal and vertical increment component values that define the slope of line L1 on the terrain map in the scene memory 41). These values may be thirteen bit words, twelve bits for identifying the magnitude of the increment and an additional sign bit. These values are supplied to the perspective read out address circuit 33 to be used for accessing elevation values from the scene memory 41. A line count signal is also produced over link 32 to be coupled to pixel address calculation circuit 63. The line clock input to counter 94 on line 92 is then advanced to increment the line counter. The state of line 93 changes to a zero, indicating an even line (L2), and the output of multiplexer 101 over link 96, which represents the angle of line L2, is added to the heading angle 25, and the above operation is repeated for line L2. This process continues until all 480 lines which define the field of view have been processed. Then the line counter is again cleared and the above sequence is repeated.

While the above description was given for a field a view of 45° (K=24), it is to be observed that the same operation takes place for a field of view of 90°, except that twice the value of the line counter 94 is supplied over link 102 to multiplexer 101. Moreover, within multiplexer 101 the value on line 93 is multiplied by two to define the least significant and next least significant bits. If the line is an odd line, the least significant bit out of multiplexer 101 is forced to a zero and the next bit is forced to a one. If the line being processed is an even line, both the least significant bit and the next least significant bit are zeros. As a result, although the spacing between the adjacent vertical lines on the screen 12 remains unchanged, as shown in FIG. 5, the spacing between the lines that access elevation points in the scene memory is increased by a factor of two, because of the increase in the size (doubling) of the field of view.

Referring now to FIG. 8 wherein a schematic block diagram of the perspective read out address circuit 33 is shown, the increment $\Delta X$ and $\Delta Y$ values as well as signals representative of the half of these values from the angle processor 31 are coupled as inputs on lines 34, 34' and 35, 35' to X multiplexer A 108 and Y multiplexer A 109, respectively. The $\Delta X/2$ and $\Delta Y/2$ values on lines 34' and 35' are employed to provide for elevation interleaving among the odd and even lines as shown in FIG. 4 and as will be described in greater detail below. The output of multiplexer A 108 is supplied over link 117 to one input of X multiplexer B 115. A second input to this multiplexer is the X start value (Xs) supplied over link 27 representative of the horizontal position of the pilot/observers aircraft in the geographical map of terrain data stored in the scene memory. The vertical component (Ys) of this position is supplied as a Y start signal over line 28 to one of the inputs of a Y multiplexer B 116 to which the output of Y multiplexer A 109 is also supplied over line 118. Selection of the inputs of multiplexers 108 and 109 is controlled by an A select signal on link 111 while the selection of the inputs of X multiplexer B 115 and Y multiplexer B 116 is controlled by a B select signal on line 110.

The outputs of multiplexers 115 and 116 are coupled over links 121 and 122, respectively, to X adder 123 and Y adder 124. Adders 123 and 124 add the contents of respective X register 131 and Y register 133 to the values supplied over links 121 and 122, respectively. As will be explained in detail below in conjunction with the description of the operation of the perspective read out address circuit 33, these circuits provide increment values for moving from point to point along an individual line L1.

The output of X adder 123 is coupled over line 125 to X register 131 and to an H secondara register 141. Similarly, the output 126 of Y adder 124 is coupled to Y register 133 and to a V secondary register 150. The contents of X register 131 are coupled over link 142 to X adder 123 and to an H primary register 144. Similarly, the contents to Y register 133 are coupled over link 143 to one input of Y adder 124 and to a V primary register 145. Registers 131 and 133 are controlled by the processor clock on link 130 while registers 141, 144, 150 and 145 are controlled by the scene memory clock on link 140. The clearing of X register 131 is accomplished by an X clear signal on line 132 while the same holds true for Y register 133 with respect to a Y clear signal on line 134.

Registers 141 and 150 supply to scene memory 41 respective horizontal secondary and vertical secondary addresses over links 154 and 156, while registers 144 and 145 supply to scene memory 41 respective horizontal primary and vertical primary addresses over lines 153 and 155. As will be explained in detail below these primary and secondary address signals are used to access elevation data values from four adjacent locations on the stored terrain map of elevation data in the scene memory 41.

Figure 10:
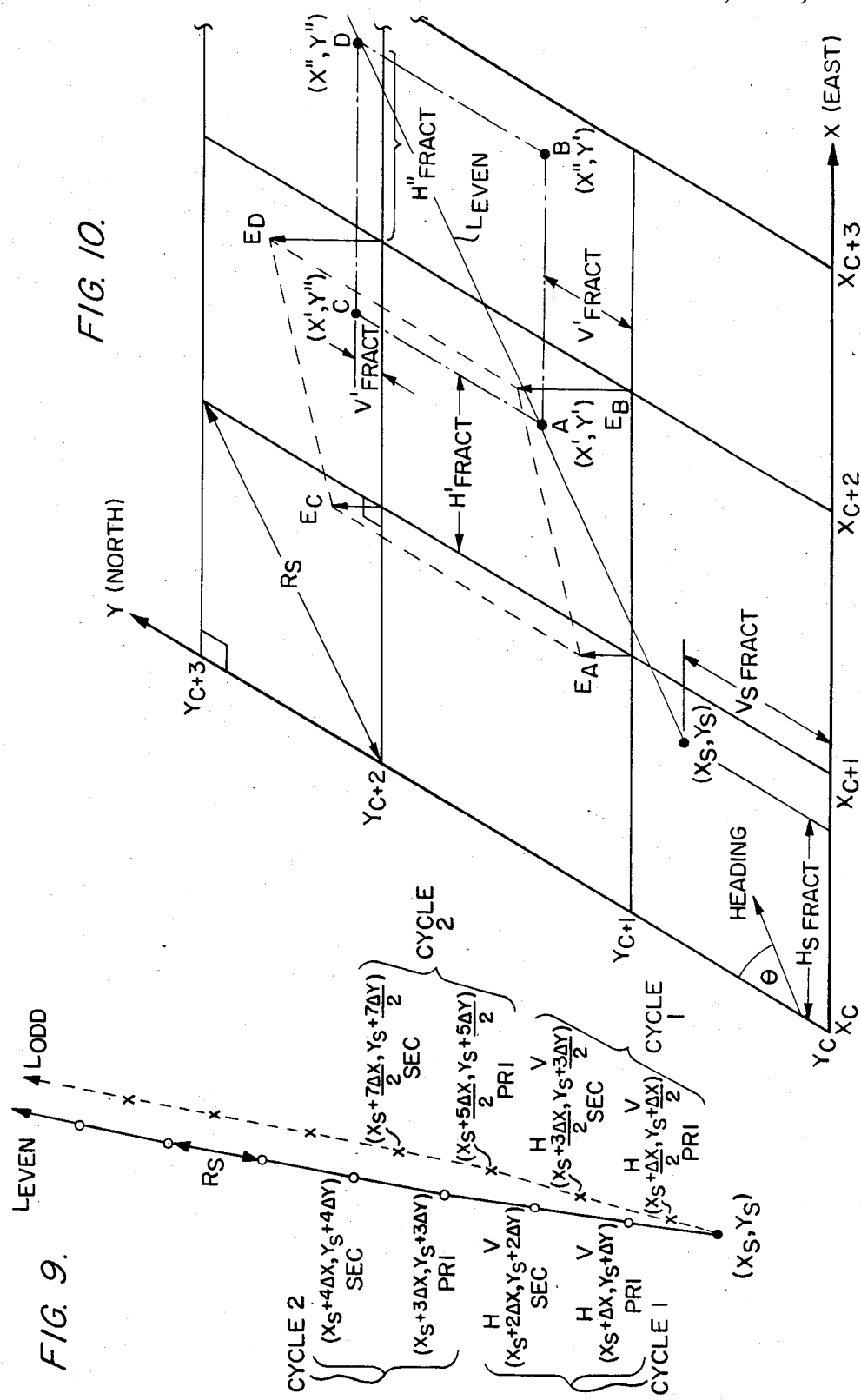
FIG. 10 shows a three dimensional layout of stored elevation data sample points and the traversal of an exemplary even line thereover for explaining the operation of the circuit of FIG. 8.
Figure 9:
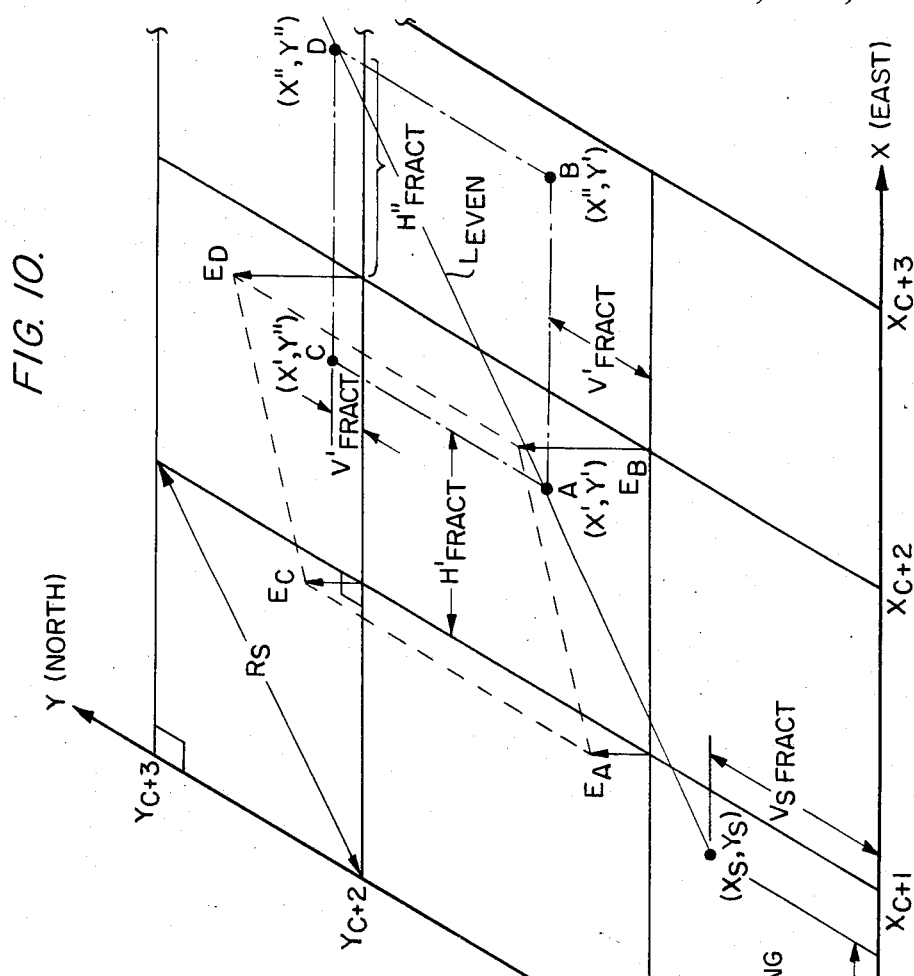
FIG. 9 shows a pair of adjacent lines along which respective elevation data samples are accessed in accordance with the operation of the perspective readout address circuit of FIG. 8.

With reference now to FIGS. 9 and 10, the operation of the perspective read out address circuit in FIG. 8 will be explained. FIG. 9 shows a pair of adjacent lines, namely an even line $L_{even}$ and an odd line $L_{odd}$ and respective elevation sample points therealong. The elevation sample points on line $L_{even}$ are identified by dots, while those on the odd line $L_{odd}$ are identified by "x"s. The starting point of each line is the point of the pilot observer $(X_s, Y_s)$. FIG. 10, shows, in an isometric diagram, a portion of an even line $L_{even}$ with graphical notations for facilitating an understanding of the operation of the components of the perspective read out address in FIG. 8.

At the beginning of a respective line, the contents of the registers are cleared and one of the inputs of X multiplexer A 108 and Y multiplexer A 109 will be selected, depending upon whether the line is odd or even. Let it be initially assumed that the line is an even line, so that the A select line 111 causes the even input $(\Delta X, \Delta Y)$ of each of multiplexers 108 and 109 to be coupled to their respective outputs 117 and 118. This means that the $\Delta X$ and $\Delta Y$ values from the PROM 104 in the angle processor 33 will be coupled as one of the inputs of each of X multiplexers B 115 and Y multiplexer B 116. At the start of a line, the B select line 110 causes the X start value (Xs) on line 27 and the Y start value (Ys) on line 28, identifying the position of the observer ($X_s, Y_s$), to be coupled over lines 121 and 122 to X adder 123 and Y adder 124, respectively. These values are added to the contents of the X register 131 and the Y register 133, respectively (which at this time are "0", because of the clear signals previously applied thereto).

It is to be noted that the contents of X and Y registers 131 and 133, respectively, which define the coordinate values of prescribed points in the terrain data map, are defined in terms of those coordinate values, namely by way of a whole number and an accompanying fraction. This may be understood with reference to FIG. 10 wherein the starting point $X_s, Y_s$ is located in a data map quadrant the lower left hand coordinates of which are ($X_c, Y_c$) Using conventional orthogonal graph notation, the quadrants are identified by unit or whole number separations, so that the longest line that may extend in any quadrant is its diagonal, shown as Rs. PROM 104 in the angle processor produces the $\Delta X$ and $\Delta Y$ values in terms of this diagonal Rs and the angle of the line of interest relative to true north, as explained previously. This is denoted in FIG. 10 by $\Delta X = Rs \sin \theta$, $\Delta Y = Rs \cos \theta$. As explained previously, the values which are supplied to the PROM 104 are derived at the output of adder 95 and depend upon both the heading angle and the contents of line counter 94 in FIG. 7.

Returning again to the starting point ($X_s, Y_s$), in terms of the quadrant values this coordinate position is stored in registers 131 and 133 as a whole number Xc, Yc and fractional value $H_s$FRACT, $V_s$FRACT, as mentioned above, and shown in FIG. 10 as $X_s = X_c + H_s$FRACT and $Y_s = Y_c + V_s$FRACT. The fractional values are supplied over links 44 and 45 (FIG. 6) for primary and secondary points from the H and V registers 144, 145, 141 and 150 to the elevations interpolator (FIG. 11).

Once the starting point of a line has been loaded into the X and Y registers 131 and 133, the state of the B select line 110 is changed, so that the X multiplexer B 115 and the Y multiplexer B 116 couple the outputs of the X multiplexer A 108 and the Y multiplexer A 109, respectively, to lines 121 and 122. In the present example, it is assumed that the line of interest is an even line, as noted above, so that on line 117 the value $\Delta X$ will be coupled through multiplexer 115 to line 121. Similarly, the $\Delta Y$ value will be coupled through multiplexer 109 and multiplexer 116 to line 122. In adder 123, the horizontal component of the starting point which is stored register 131 is added to the incremental value supplied over line 121 and again inserted into register 131 at the next process clock signal on line 130. The same holds true for the starting vertical component. This is shown in FIG. 10 within the segment of cycle 1 as the first point ($X_s + \Delta X$, $Y_s + \Delta Y$). The X value ($X_s + \Delta X$) is applied over line 142 and stored in a horizontal (H) primary register 144, while the vertical component or Y value ($Y_s + \Delta Y$) is supplied from Y register 133 over line 143 to be stored in vertical (V) primary register 145. The process clock is advanced at twice the rate of the scene memory clock so that the output of the X register 131 is loaded into the H primary register 144 and the output of the X adder 123 is loaded into the H secondary register 141 for each scene memory cycle read out clock signal on line 140.

The secondary point is defined by an additional $\Delta X$ and $\Delta Y$ increment produced at the next process clock on line 130. In FIG. 10, the primary point on line $L_{even}$ is identified by coordinates (X',Y') while the secondary point is identified by coordinates (X", Y"). This point is also identified in FIG. 9 within cycle 1 (a single scene memory cycle or two process clock signals) by values ($X_s + 2\Delta X$, $Y_s + 2\Delta Y$). For the next scene memory clock signal cycle, the next two points are generated, and so on, as shown in FIG. 9 for the even line, so as to step through successive points along the even line. This process continues until address values for a total of 240 points per line have been generated.

For an odd line, the displacement from the starting point is offset relative to that of the even line by a value of ($\Delta X/2$, $\Delta Y/2$) by initially selecting the $\Delta X/2$ and $\Delta Y/2$ inputs of multiplexers 108 and 109 for the first cycle and then switching back to the $\Delta X$ and $\Delta Y$ values for the secondary point of the first cycle and all subsequent points. This causes an odd line to proceed along the points that are disposed substantially half way between or interlaced between the points of the adjacent even lines, as shown at the "X"s along the odd line $L_{odd}$ of FIG. 9. Thus, for a first processing cycle, namely a first cycle for the scene memory clock which encompasses two processing clock times, at the start of the odd line, there will be produced a primary location ($X_s + \Delta X/2$, $Y_s + \Delta Y/2$) and a secondary point on the same line spaced a distance Rs therefrom of ($X_s + 3\Delta X/2$, $Y_s + 3\Delta Y/2$).

As a result of the foregoing spacing between points on the odd and the even lines, for any cycle, a pair of primary and secondary displacement values are produced as a horizontal primary displacement ($X_s + (4N-3)\Delta X/2$) and a horizontal secondary displacement ($X_s + (4N-1)\Delta X/2$) and a vertical primary displacement ($Y_s + (4N-3)\Delta Y/2$) and vertical secondary displacement ($Y_s (4N-1)\Delta Y/2$). For an even line, during any cycle N, for horizontal increment there are a pair of primary, secondary displacements ($X_s + (2N-1)\Delta X$) and ($X_s + 2N\Delta X$), respectively, and a pair of primary, secondary vertical displacements as ($Y_s + (2N-1)\Delta Y$, $\Delta Y_s + 2N\Delta Y$) respectively.

As noted previously, each of the primary and secondary values, which are to be employed as address signals for addressing the scene memory 41 and supplying values for the elevation interpolator 53, includes a whole number or quadrant identifier number and a fractional value. Through the respective horizontal and vertical primary and secondary values, namely the X, X', Y and Y' values shown in FIG. 10, it is possible to access from the scene memory four points, two of which (X',Y') and (X", Y") lie on the line of interest and the other two of which are orthogonally disposed (in terms of their X and Y values) with respect to these points. In this fashion, the point having coordinates (X',Y'), namely point A as shown in FIG. 10, is identified as a primary point on the line $L_{even}$ and the additional points B, C and D are identified as secondary points, secondary point D being on the line at coordinates (X", Y"). The manner in which these values are employed for further address and brightness calculation processing will be described below with reference to the description of the elevation interpolator 53 in FIG. 11 and the brightness calculation circuit 71 in FIG. 12.

The elevation interpolator, a schematic block diagram of which is shown in FIG. 11, performs the function of determining or interpolating the elevation of the terrain data map points along each respective line of observation within the field of view of the pilot/observer. In order to facilitate an understanding of a functional grouping and operation of the components of the elevation interpolator shown in FIG. 11, the description to follow will make reference to both FIG. 10, discussed briefly above, and FIG. 11 itself. For purposes of explaining the construction and operation of the elevation interpolator, an exemplary line of observation $L_{even}$, a portion of which is shown in FIG. 10, will be referenced. In terms of the coordinates of the terrain data map, line $L_{even}$ has a positive slope and lines wherein the Y axis lies in a north-south direction and the X axis lies in a east-west direction). Lines 171 and 181, which control the selection of the inputs of a pair of multiplexers 172 and 182, respectively, provide binary ("1" or "0") control signals to multiplexers 172 and 182 and represent the polarity of the heading of the aircraft in terms of their signs in the definition in the X, Y coordinate system. their signs. For the line $L_{even}$ in FIG. 10, the polarity is positive and the aircraft is assumed to be heading in a northeasternly direction so that the heading of the aircraft has a positive polarity. If the aircraft were heading in a southwesternly direction along the line $L_{even}$, so that the observer's location ($X_s$, $Y_s$) were at the upper right hand end of the line, the incremental values along the line would be negative X and negative Y values, so that lines 171 and 181 would cause the multiplexers 172 and 182 to select complementary values of the horizontal and vertical fraction values for each of the respective points being processed.

A register 195 is coupled to receive from scene memory 41, via lines 191–194, the stored elevation values for the respective quadrants containing points A, B, C and D shown in FIG. 10. Point A is considered a primary point so that the elevation data values are respectively $E_A$ for point A, $E_B$ for point B, $E_C$ for point C and $E_D$ for point D. These elevation values are loaded into register 195 in accordance with the scene memory clock on line 140. Output link 201, which represents the $E_A$ data value, is coupled to one input of a north-south multiplexer 205 and an east-west multiplexer 207. The $E_B$ data value is coupled over link 202 to the other input of north-south multiplexer 205 and to one input of east-west multiplexer 208. Output 203 representative of the $E_C$ data value is coupled to one input of input north-south multiplexer 206 and to a second input of east-west multiplexer 207. Finally, output link 204 which represents the $E_D$ data value stored in register 195 is coupled to a second input of north-south multiplexer 206 and a second input of east-west multiplexer 208.

Each of multiplexers 205 and 206 is controlled by a north-south select signal on line 185, whereas each of east-west multiplexers 207 and 208 is controlled by an east-west select signal on line 186. The output of each of north-south multiplexers 205 and 206 is coupled over respective links 211 and 212 to a north-south adder circuit 215 whereas the outputs of 213 and 214 of east-west multiplexers 207 and 208, respectively, are supplied as inputs to adder 216. These multiplexers and adders operate to provide elevation slope values for the respective elevation points along an observation line, such as line $L_{even}$ of FIG. 10.

In order to determine the east-west slope of point A along line $L_{even}$, the $E_A$ and $E_B$ values and the $E_C$ and $E_D$ values are respectively subtracted from one another. For this purpose, the east-west select line 186 causes multiplexer 207 to couple input link 201 (representative of the $E_A$ data value) to its output 213 and multiplexer 208 to couple its input line 202 (representative of the $E_B$ data value) to its output line 214. These values are subtracted in circuit 216 to provide the value quantity ($E_B - E_A$) at the output line 62 representative of the east-west elevation slope. For the north-south elevation slope, select line 185 causes north-south multiplexer 205 to couple link 201 to output 211 and multiplexer 206 to couple link 203 to output 212, so that the $E_A$ and $E_C$ values are subtracted from one another as a first elevation slope value relative to point A which is supplied over link 61 as the north-south slope point A.

A similar operation takes place with respect to the secondary point D on line $L_{even}$ whereby, for the east-west slope, the $E_C$ and $E_D$ values are subtracted from one another and, for the north-south slope, the $E_D$ and $E_B$ values are subtracted from one another. The selection of these points will depend upon the direction of the heading of the aircraft along line $L_{even}$. For the present example, it assumed that the aircraft is moving in a northeasternly directly, so that the east-west slope is determined by the ($E_B - E_A$) value and a north-south slope is determined by the ($E_C - E_A$) value. Thus, the north-south slope applied over line 61 will be supplied as one input to a multiplier 221 to be multiplied by the fractional value which is coupled through multiplexer 172 over link 174. This produces the value ($E_C - E_A$) × $V_{FRACT}$ on output line 233. Similarly, east-west multiplier 222 multiplies the value ($E_B - E_A$) supplied by east-west adder 216 by the fractional value supplied over link 184 through multiplexer 182 (namely the $H_{FRACT}$ value) to produce the quantity ($E_B - E_A$) × $H_{FRACT}$. This value, on line 234, is added to the value on line 233 by fractional adder circuit 223 to produce the value:

$$\frac{(V_{FRACT} \times (E_C - E_A) + H_{FRACT} \times (E_B - E_A)}{2}.$$

If the aircraft heading were in a southwesternly direct along line $L_{even}$, fractional adder would produce the value $$\frac{(V_{FRACT} \times (E_D - E_B) + H_{FRACT} \times (E_D - E_C))}{2}$$

This fractional sum is applied over line 232 to an adder circuit 235. The other input of adder circuit 235 is supplied over link 231 from a multiplexer 224. Multiplexer 224 is coupled to receive the primary ($E_A$) and secondary ($E_D$) elevation values on lines 226 and 227, respectively. Namely, link 226 provides the elevation data ($E_A$) value for point A and line 227 provides the elevation data value for point D. Which of these values is selected is determined by a primary/secondary selection line 225. For point A of interest here, the primary elevation value ($E_A$) will be coupled over line 231 to adder 235. Adder 235 adds the elevation value to the slope values determined from the elevation data values from points A, B, C and D, discussed previously. The fractional values for the location of the points in the respective quadrants of the terrain map are used to interpolate the slope of the terrain at these points. Namely, the fractional values represent the relative displacement of the primary and secondary points from those positions in the terrain data map at which the elevation values are known and stored. Points in between are simply interpolated on the basis of coordinate offset as shown in FIG. 10, explained previously. Accordingly, the output of the interpolation adder circuit 235 represents an interpolated value of the elevation at A, which is offset by H'FRACT and V'FRACT from the coordinate position $(X_{c+1}, Y_{c+1})$ at which the elevation value of $E_A$ is known and stored in scene memory 41.

The output of interpolation adder 235 is coupled over link 243 to one end of input multiplexer 242. Multiplexer 242 has a second input coupled over link 245 from a delay circuit 244 the input of which is coupled to link 231 from the multiplexer 224. Multiplexer 242 is controlled by an interpolate select line 241 and has its output coupled to output link 54 to supply an elevation signal for each point of interest. The purpose of the multiplexer 246 is to permit the bypassing of the interpolation circuitry of the elevation interpolator and simply couple the elevation values that are derived from the scene memory directly to the output link 54 without interpolation that is achieved by the slope interpolation process described above.

Figure 12:
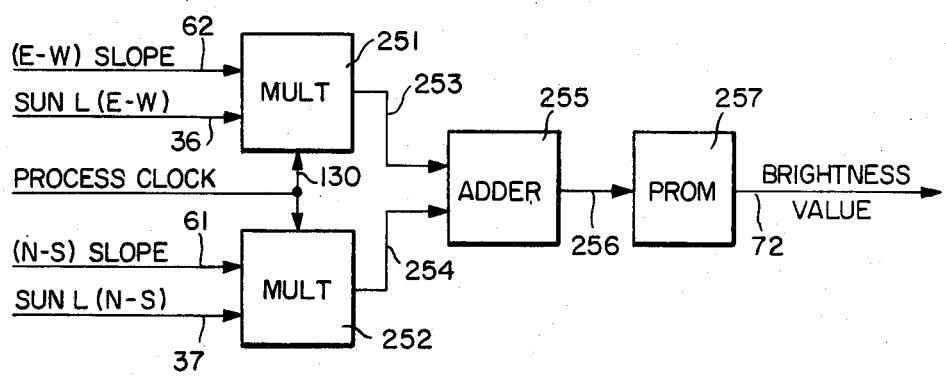
FIG. 12 shows the details of brightness calculation circuit 71 of FIG. 6.
Figure 14:
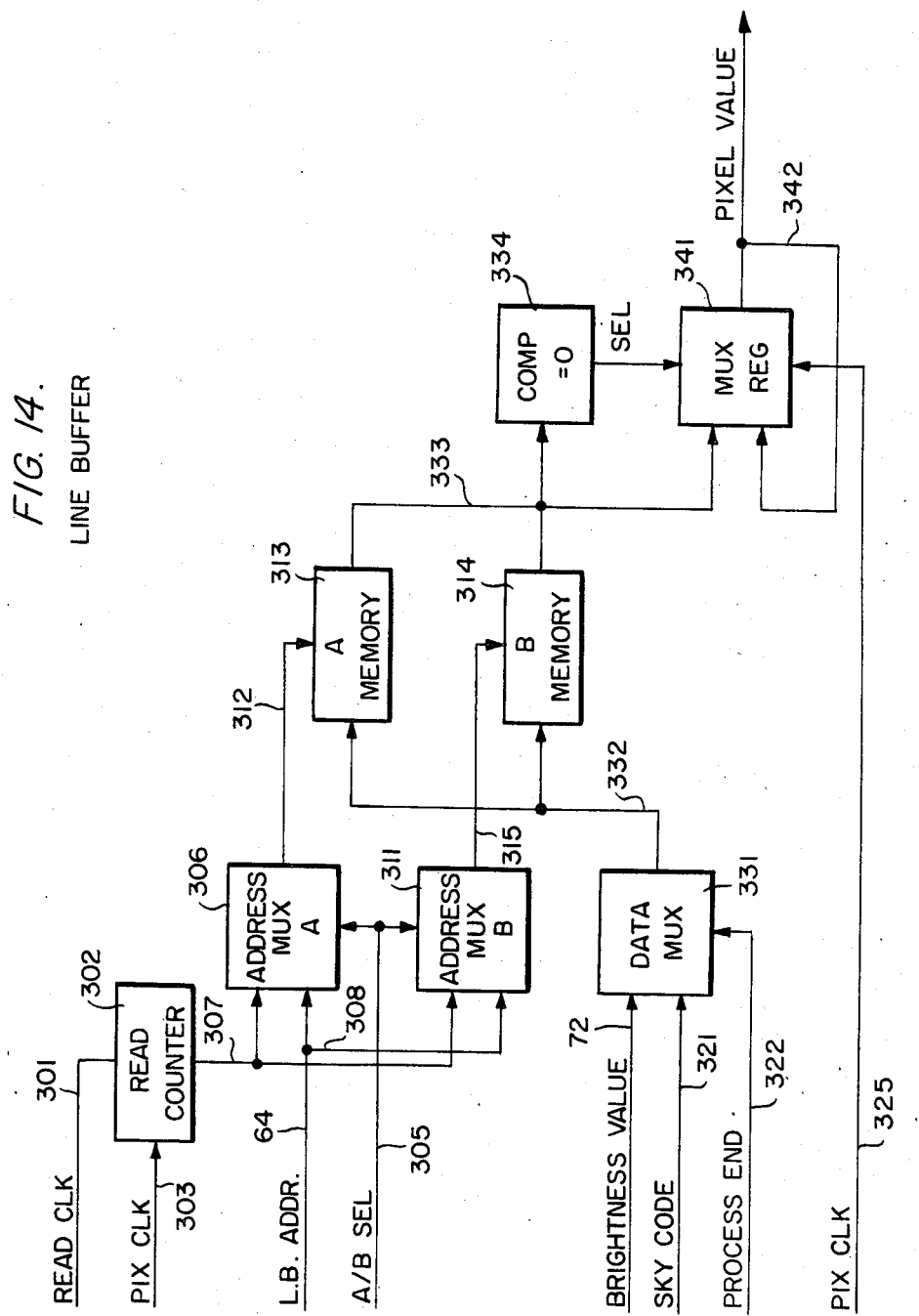
FIG. 14 shows the details of the line buffer circuits 81 of the system diagram of FIG. 6.

Referring now to FIG. 12, wherein the brightness calculation circuit 71 is shown, the north-south and east-west slope values, as is applied over line 61 and 62, respectively, from the elevation interpolator of FIG. 11, are applied to respective inputs of multipliers 251 and 252. The east-west, north-south sun angle values from PROM 104 within the angle processor are respectively coupled over lines 36 and 37 as second inputs to the multipliers 251 and 252. Multipliers 251 and 252 are operated by the processor clock on line 130 and produce composite values for the east-west and north-south shading of a pixel on lines 253 and 254. These two values are added together in adder 255, the output of which is coupled over line 256 to a brightness PROM 257. This averaged value addresses brightness PROM 257 to extract therefrom a pixel intensity value for the vertical line on the display screen corresponding to the line of observation being processed. Since the process clock operates at twice the frequency of the scene memory clock two values are obtained for every memory access, one for the primary elevation point A and the other for the secondary elevation point D. These values are coupled over link 27 to the line buffers 81 (FIG. 14).

Figure 13:
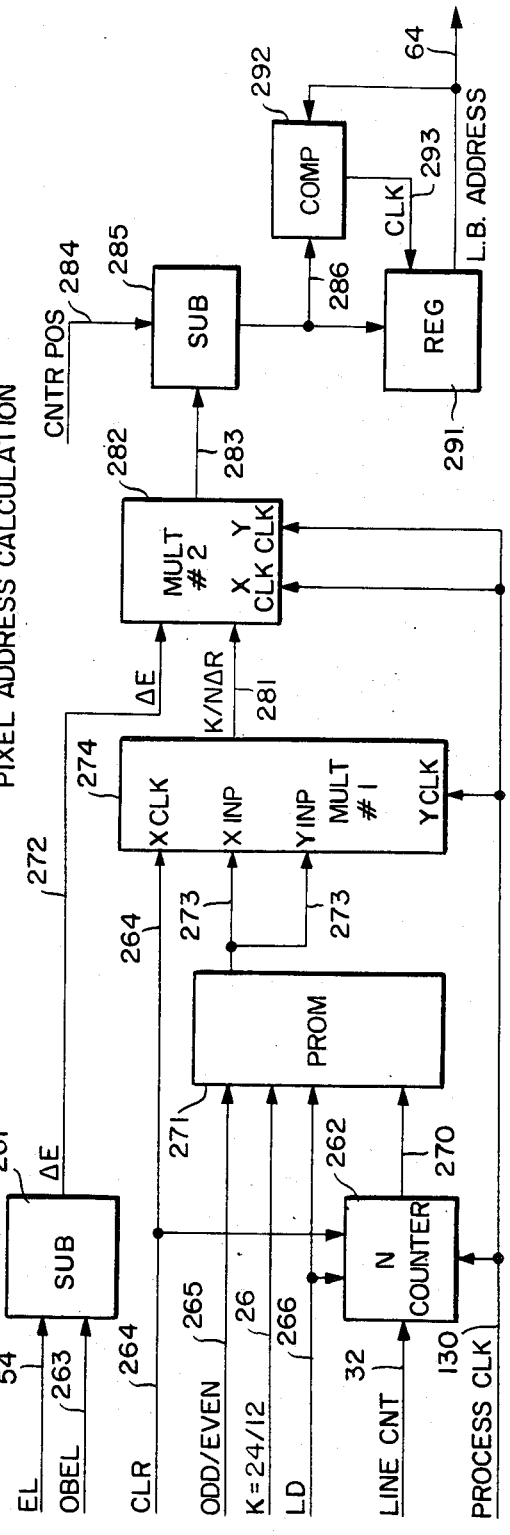
FIG. 13 is a detailed schematic diagram of the pixel address calculation circuit 63 of FIG. 6.

The details of the pixel address calculation circuit 63 are shown in schematic block diagram form in FIG. 13. The elevation values from multiplexer 246 over line 54 are coupled as one input to a subtraction circuit 261. The second input over line 263 is derived from the aircraft's altimeter and represents the elevation of the aircraft, namely the observer. These values are subtracted from one another to obtain an elevation differential value $\Delta E$ on line 272 which is coupled as one input to a multiplier 282. The pixel address calculation circuit also includes a line point counter 262 which is incremented by processor clock 130 and loaded under the control of a signal on line 266. A line count value is supplied over line 32. The output of the counter is coupled over line 270 to a PROM 271. Counter 262 and registers within the multiplier 274 are cleared by a signal on line 264.

PROM 271 generates values corresponding to the incremental steps along each scan line, namely corresponding to the spacing $R_s$, mentioned previously, in accordance with the selected field of view. As shown in FIG. 5, the spacing between elevation sample points from the data map will be greater for a field of view of 45° than for 90° since the observer is effectively further away from the screen. For a 45° versus 90° selectivity, the spacings between points on the lines for the 45° field of view are twice the separation between points for a 90° field of view. For this reason, the K=24/12 value is applied over line 26 to PROM 271. The output of PROM 271 is coupled over link 273 to X and Y registers contained within multiplier 274.

At the beginning of each line, the value of the line count is loaded into the line point counter 262. This line count is obtained from the angle processor 31 (FIG. 7) and identifies which observation line $L_i$ from the observer to the screen is being processed. Once this value has been loaded into the line point counter 262, PROM 271 now has all of the information it needs to produce a proper $1/\Delta R$ value indicative of the incremental steps along a line of observation from the observer.

As will be recalled from the previous discussion of the translation or conversion scheme according to the present invention referencing FIGS. 2 and 3, a pixel location along the vertical line of interest on the display screen, such as that for ray R1 (FIG. 3), is proportional to the differential elevation $\Delta E_i$ between the observer $EL_{obs}$ and the point $P_i$ on the terrain effectively intersected by that ray and the distance $\Delta Ri$ between the observer and the point on the terrain along a line perpendicular to the screen, namely line $R_H$ directed at the infinite horizon. PROM 271 generates, for each respective point Pi along the observation line $L_i$, the proper differential separation value, namely the value $R_i$ (here actually the reciprocal of that because of the counting of units or unit separation spacings Rs from the observer to the screen). This value will remain the same for each elevation sampling point along a particular ray; it only changes when the scan proceeds to the next observation ray.

Via line 264, the line point counter 262 is cleared and the $1/\Delta R$ unit value is loaded into the X register of multiplier 274. PROM 271 also outputs the value K/N, where K depends upon the field of view chosen as indicated by the value on line 26. At each processor clock signal on line 130, the line point counter 262 is incremented as the system advances from one elevation point $P_i$ to the next along the line of observation $L_i$ and the line point counter is incremented. The output of PROM 271 is K/N for an even field and K/(N−0.5) for an odd field, where N is the count value in the line point counter 262. The output of the PROM is supplied to X and Y inputs of multiplier 274. For an even line, its output is K/N $\Delta R$, whereas for an odd line, its output is K/(N−0.5) $\Delta R$).

Multiplier 282 multiplies this value on line 281 by the elevation differential $\Delta E_i$ on line 272 so as to locate a pixel position $S_i$ on the vertical line on screen 12 that is intersected by the ray of observation $R_i$ that passes through the point $P_i$ on the terrain map at the elevation sample point as shown in FIG. 3, described above.

As shown in FIG. 3, at the beginning of the line scan, where the points along the line of observation on the terrain map are very close to the observer, (e.g. points P′1, P′2, P′3,P′4) an observation ray (e.g. R′1, R′2, R′3, R′4) passing through these points may fall beneath the screen (depending upon the altitude of the aircraft). Since such points do not correspond to any of the display pixels on the display screen, they obviously are not to be reproduced for the pilot observer. To take this into account, the output of multiplier 283 is supplied to a subtractor 285 which substracts a counter position value supplied over line 284. This differential value is supplied over line 286 to a comparator 292 and a register 291. The output of register 291 is coupled over line 64 as a line buffer address signal to the line buffer circuitry of FIG. 14, to provide a pixel address corresponding to the ray of interest to the observer on the display screen 12. Line 64 is also coupled to a second input to a comparator 292, the output of which is coupled over line 293 to register 291. By subtracting the output of multiplier 282 on line 283 from the counter position 284, the effect is to move the infinite horizon position on the display screen relative to the observer. The output of subtractor 285 is tested to see whether the pixel position of interest falls within the limits of the display screen, namely whether it is less than the value 0, corresponding to the bottom of the screen, or greater than the value 511, corresponding to the $512^{th}$ pixel at the top of the screen. If other words, if the ray falls off the screen it is certainly not going to be recognized by the pixel address circuitry for the line buffers. Instead, the last value that is stored in the register 291 is retained. If the output of subtractor 285 falls within the limit of the screen, namely between zero and 511, that value is loaded into register 291, as a result of a comparison between the current value of register 291 and the current output value of subtractor 285 as determined by comparator 292. The purpose of comparator 292 is to prevent the storage of a brightness value for a terrain location that cannot be seen by the observer but which is is identified during the line scan.

For example, referring again to FIG. 3, as the line point scan proceeds to point $P_7$ it will access an elevation value therefor. However, from the observer's standpoint, because a previous point $P_6$ has a higher elevation than point $P_7$, the terrain at $P_7$ is hidden from the observer's view. What will be seen by the observer is whatever appears along ray $R_7$ which passes through each of points $P_6$ and $P_7$. However, since the ray $R_7$ intercepts the terrain at point $P_6$ first, the brightness value for the pixel at that location, namely point $P_6$, will be imaged on the screen at the corresponding intersection pixel. The pixels along the vertical line on the screen are sequentially addressed from the bottom to the top of the screen, and once a point is passed there is no return to it. Accordingly, when the elevation interpolator extracts a new elevation value that will intercept a previously observed ray, since the pixel point that is intercepted by that ray has already been processed and its value stored in the line buffer, the new value is ignored. In other words, comparator 292 causes the contents of the address register 291 to be stored with values which represent successively advanced points along the vertical line on the screen, which may or may not be equated with the successively advanced points along a line of observation from the observer on the terrain map.

Referring to FIG. 14, the line buffer is shown as being comprised essentially of a pair of line memories 313 and 314, which are operated in ping-pong fashion, namely one is receiving new data from a new scan line while the other is being read out and presented to the scanning circuitry of the display screen. To control the storage and readout of the ping-pong memories 313 and 314, a read counter 302 is employed. Initially, the read counter is cleared via line 301. The output of read counter 302 is coupled over link 307 to a pair of address multiplexers 306 and 311. A second input of each of these multiplexers is derived from line buffer address link 64 from the pixel address calculation circuitry, discussed above in conjunction with FIG. 13.

As pointed out previously, in accordance with the simplified version of the invention, a standard CRT display is physically installed in the cockpit instrument panel with a 90° rotation, so that 512 horizontal scan lines are effectively rotated into a vertical plane and will correspond to the vertical lines of observation by the observer. When the first line of a field is to be processed, the A/B select line 305 causes address multiplexer 306 to couple the line buffer address on link 64 to its output 312 and the address multiplexer 311 to couple the read counter output on line 307 to its output 315. Data which is supplied to the data multiplexer 331 is thus written into one of the memories 313 and 314 as designated by the address contents of links 312 and 315.

Data multiplexer 331 is coupled to receive the brightness value output from the brightness calculation circuit 71 on link 72 and a sky code on link 321. The sky code consists of all ones and data multiplexer 331 couples this input to its output on line 332 when the observation line of interest goes above the terrain. The brightness values themselves may be encoded into 16 different gray levels, two of which are considered to be illegal, the above mentioned sky code (all "1"s) and an all "0"s value. These values are inhibited from being generated by PROM 257 by the brightness calculation circuit 71. Each of memories 313 and 314 is cleared before a write cycle into the line buffers and the display is begun.

At the start of the processing cycle for a line of the field of interest, such as line L1 (FIG. 4), the first line of the odd field, the line buffer address is set to zero and the first brightness value is then written into the address zero of the memory 313. Namely, the A/B select line 305 causes multiplexer 306 to couple the zero contents of link 64 over link 312 to the address input of memory 313. The first brightness value for that pixel position is coupled through data multiplexer 331 on line 332 and stored in memory 313. As legitimate line buffer addresses are calculated by the pixel address calculation circuit 63 and data values from the brightness calculation circuit 71 are derived, the data values corresponding to the respective points on the screen, namely the respective rays of observation, are written into memory 313. This operation continues until all 240 points along the observation line of interest have been processed. At the end of a observation processing cycle, the sky code, namely all "1"s supplied over link 321, is coupled through multiplexer 331 and written into the last valid address calculated by the pixel address calculation circuit through 63.

At the start of the next line of the field, such as line L3 of the odd field, the data that was previously stored in memory 313 is read out, as the state of the A/B select line 305 changes and the second line of data is written into memory 314. The data that is read out is coupled over line 333 to a comparator 334 and one input of a multiplexer register 341. The contents of the read counter 302 are applied through multiplexer 306 to memory 313 to cause the sequential read out of the contents of memory 313. Read counter is incremented from a value of zero, namely its initially cleared value to a value of 511, so as to step through the 512 pixel position along the line of data that is being supplied to the display. As data is read out of the memory 313, it is examined by comparator 334 to determine whether or not it is all "0"s. If the data is all "0"s (namely a black level), then the previous pixel value is multiplexed by into the multiplex register 341 via line 342. If the data is not all "0"s, the multiplexer register 341 is loaded with the new data value on line 333. This pixel data value is supplied to the display for presentation to the observer at its respective scan point on the vertical line of interest on the screen 12.

After the above process is completed, the line buffer proceeds to write in the next line of data as it reads out the previous line of data and the roles of the memories 313 and 314 are reversed. This process continues until all the lines of the field have been sequentially written into the line buffers and read out and displayed on the vertical lines of the screen to the pilot/observer. Then the other (e.g. even) field is processed so that upon completion of processing both the odd and even fields, a total of 480 lines of observation of the pilot/observer's field of view will have been displayed on the cockpit CRT display.

In the above description of the basic embodiment of the present invention, the scanning of the pixels of the cockpit CRT display is accomplished by rotating the CRT display 90°, so that simplified line buffer circuitry may be employed in conjunction with the CRT's horizontal scanning circuitry to generate the successive vertical display lines (of observation) across the face of the pilot/observer's display screen, thereby achieving a considerably simplified hardware configuration. As mentioned above, however, in place of using line buffer circuitry, which requires physical rotation of the cathode-ray tube, a conventional ping-pong field screen memory arrangement may be used. This ping-pong screen arrangement provides for storage of the entirety of the respective odd and even fields that make up a field of view, which data may then be selectively accessed to allow for real time changes in attitude of the aircraft, specifically, changes in pitch and roll of the aircraft.

Figure 15:
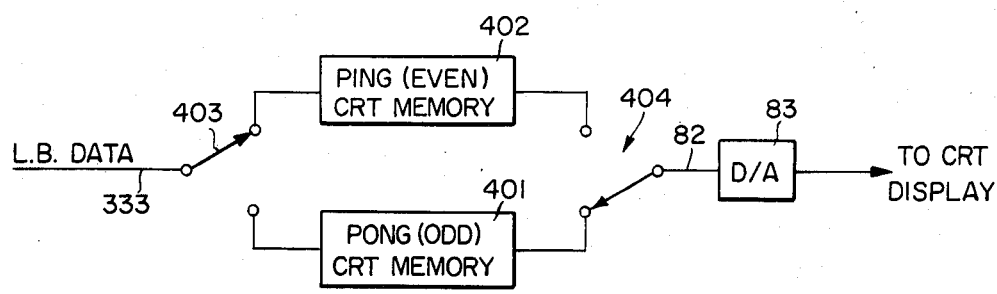
FIG. 15 is a block diagram of a ping-pong screen memory arrangement.

Such a ping-pong screen memory arrangement is depicted in FIG. 15 as consisting of a ping memory 402, which stores data values, for all of the lines of observation of an even field within the field of view of the observer, while the pong memory stores the data values for the odd field. The memories operate in alternate fashion such that during an even field writing operation, namely during the time the data points for an even field are being processed through the line buffer circuitry of FIG. 14 and written into ping memory 402, previously stored values for the odd field are being read out of the pong memory 401 for display on the pilot/observer's cockpit CRT. This particular mode is schematically shown in the switch configuration of FIG. 15 wherein the line buffer data on line 333, corresponding to the outputs of respective A memory 313 and B memory 314 of the line buffer circuitry shown in FIG. 14, is applied through a switch 403 which is selectively applied to the input of one of the ping memory 402 and the pong memory 401. Data that is read out from these memories is selectively coupled via switch 404 to link 82 to be converted into analog form by D-A converter 83 and supplied over link 84 to the cockpit display CRT. The positions of switches 403 and 404 are reversed from that shown in FIG. 15 when an odd field is to be written into memory 401 and a previously written even field is to be read out of ping memory 402 for display.

Figure 16:
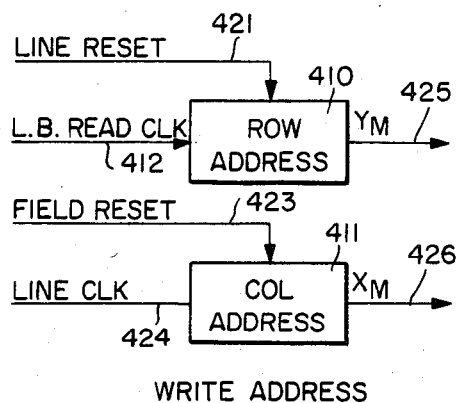
FIG. 16 shows write address circuitry for accessing the ping-pong screen memory arrangement of FIG. 15 during the write mode.
Figure 17:
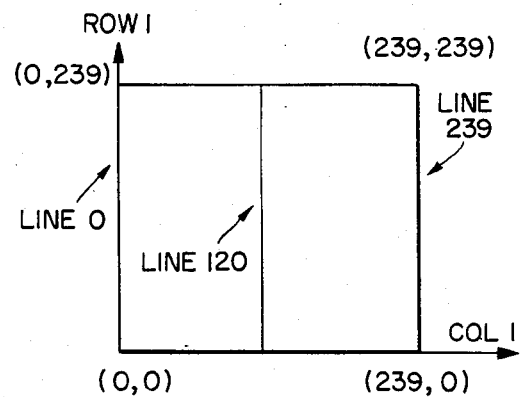
FIG. 17 shows the line-vs.-column arrangement of a screen memory.

The circuitry for controlling the selective addressing to these memories for writing data from the line buffers 313 and 314 into the ping-pong memories 402 and 401 is shown in FIG. 16. FIG. 17 shows the matrix format of an individual one of the ping-pong memories in terms of the rows and columns of data values that are stored therein and accessed by the addressing circuitry to be described below.

As noted above, in accordance with the basic embodiment of the invention wherein the cockpit CRT is physically rotated 90° in its installed position in the cockpit instrument panel, the outputs of the line buffers 313 and 314 of the line buffer circuitry of FIG. 14 are effectively directly coupled to the (rotated) horizontal scanning circuitry of the cockpit CRT unit as each line of data in an individual one of the line buffers corresponds to one of the horizontal (rotated to the vertical) scan lines of the CRT (which has been physically rotated 90°). When using the ping-pong screen memory arrangement of FIG. 15, however, the cockpit CRT display is no longer rotated 90°, but, instead, is employed in its normal upright physical orientation, so that the normal sweep of the electron beam across the face of the CRT produces a pattern of successive horizontal line sweeps (conventionally including 480 display lines and 45 retrace line intervals). In accordance with the present modification of the basic embodiment of the invention, the contents of each ping-pong CRT screen memory which represent a complete field (odd or even) of data, it is possible to orient (in real time) the presentation of that data on the cockpit display in accordance with any attitude of the aircraft. This is achieved by a memory read out control subsystem that responds to attitude sensor signals from the aircraft's guidance system to controllably address the contents of the ping-pong screen memories, so that the pixel data extracted therefrom is presented on the cockpit display in a manner which reflects the attitude of the aircraft.

For example, for a counter-clockwise roll of the aircraft, the scene that would be observed by the pilot would roll conversely (clockwise) and the data accessing circuitry (for read out) which selectively addresses the contents of the ping-pong screen memories does so in a manner to place the respective pixel data that is extracted from the ping-pong screen memories into locations on the CRT display so that the perspective view that is presented to the pilot/observer is in accordance with the attitude of the aircraft. Similarly for a change in pitch of the aircraft (e.g. nose-up), the data accessing circuitry reads out the contents of the ping-pong screen memories to count a vertical shift (e.g. down and translation for a nose-up attitude) of the same data presented on the face of the cockpit CRT display.

The writing of the data from the line memories 313 and 314 of the line buffer (FIG. 14) is straightforward. The write address circuitry shown in FIG. 16 includes a row address generator (counter) 410 and a column address generator (counter) 411. Each of these counters responds to clock signals supplied thereto and generates a digital output code identifying an address in the screen memory for the field of interest (either screen memory 402 or screen memory 401) over lines 425 and 426 for identifying the memory location into which line buffer data supplied from link 333 and switch 403 is to be written. Row address counter 410 counts line buffer read clock signals over link 422 and successively increments the code on line 425 representative of the row within the screen memory of interest being addressed. Counter 410 is reset by a line reset signal on line 421. Similarly, column address counter 411 counts line clock signals on line 424 and supplies a code indicative of the count value therein over line 426 to identify a column address in the screen memory of interest being accessed. Counter 411 is reset by field reset signal on line 423.

The operation of the write address circuitry will be best understood by reference to FIG. 17 which is a schematic map of the contents of an individual screen memory into which the respective lines of data from the line buffer circuitry (FIG. 14) are written by the write address circuitry of FIG. 16 and from which a previously stored field of data is read out in accordance with the attitude of the aircraft by the read address circuitry to be described subsequently.

In the description to follow, reference will be made to the writing of an even field of data being written into ping screen memory 402. Of course, effectively the same operation takes place with the pong screen memory 401 except that the lines being written therein are odd lines as opposed to the even lines described here. For an even field of a frame, ping-pong line memories 313 and 314 will be successively loaded with even lines (corresponding to vertical lines of observation from the pilot/observer) of data. As shown in FIG. 17, the first line of data of an even field corresponds to line 2 which is to be loaded into screen memory 402 such that it is aligned with column 0 and the respective data values therein are stored at row positions 0–239. It is to be again recalled that in accordance with the present embodiment, the cockpit CRT is not physically rotated 90°, but is installed in the instrument panel of the aircraft in its normal upright position. This means that each field of data will contain 240 horizontal lines, so that only 240 data values will be stored for an individual line. In the description of the basic embodiment, a much larger number of data values was stored in line buffers 313 and 314 (the number 512 being given as an exemplary parametric value above). When employing the screen memories 402 and 401, accordingly, the size of the memories 313 and 314 is reduced to match the number of rows of data that are stored in the screen memories (here 240 rows per field) so as to match the horizontal line scanning capacity of the cockpit CRT. Thus, the size of the line buffers 313 and 314 will be reduced such that each contains 240 memory locations. Reducing the size of the memory locations also requires a corresponding change in the value of K described above as part of the algorithm for the addressing scheme for these memory locations. This is a simple mathematical exercise so that the resulting field of view encompasses 240 screen memory locations instead of the number 512, given as the example above. Of course, neither of these numbers is limitative and the present invention is applicable to any size of display screen. For example, if the display screen were an extremely high resolution CRT unit containing on the order of 2,000 horizontal line sweeps, then the size of the line buffers 313 and 314 would each have to be increased to a capacity on the order of 1,000 data locations and the value of K would, correspondingly, be adjusted to take this into account. In any event, for purposes of the present description, it will be assumed that a conventional 525 horizontal line sweep CRT display unit is employed, so that each screen memory contains a matrix of 240×240 memory locations.

The operation of the write address circuitry of FIG. 16 proceeds such that the contents of the line buffers 313 and 314 (FIG. 14) are loaded into successive columns in the screen memory, as noted above. At the beginning of a field, each of the column and row counters 410 and 411 is reset, the field reset signal on line 423 resetting the column address counter 411 to 0 and the line address signal on line 421 resetting the row address counter 410 to 0. When the first line of data for the even field (corresponding to observation line 2) from the A memory 313 of the line buffer circuitry is coupled over line 313, the line buffer read clock which causes the read out of the contents of the 240 memory locations of line buffer 313 is also applied to row address counter 410. This means that the respective data values for the 240 memory locations from buffer 313 are loaded into successive row locations of column 0 as row address counter 410 is successively incremented by the line buffer read clock 422 and generates successive row address signals on line 425. The column address signal on link 426 remains the same during this line of data since it is only incremented by the line clock.

At the end of the first line, the line clock is incremented on link 424 to advance the column address counter 411 to column 1 while the line reset signal on line 421 (rolling over after the value 239) resets row address counter 410 and the contents of B memory 314, representing observation line number 4, or the second line of the even field of data, is written into the successive row locations of the second column (column 1) of the memory locations of screen memory 402. The next line clock increments column address counter 411 to the third column (column 2) of screen memory 402, while the line reset rollover signal on line 421 resets row address counter 410 to row address value 0. As the line buffer read clock signals are applied over line 422, the third even line of data, which has been stored in A memory 313 in the line buffer (corresponding to vertical line of observation number 6 or the third line of data of an even field) is written into the third column of memory 402. The above process is repeated until, finally, the last even line (corresponding to observation line 480) is read out of buffer 314 in the line buffer circuitry and written into column 239 of memory 402.

At the completion of loading of the ping memory 402, switches 403 and 404 reverse positions and the field reset signal 423 resets the column address counter 411 back to the first column (column 0) and the above process is carried out for the odd field of data. During this time, contents of the ping memory 402 are read out under the control of read address circuitry to be described below in accordance with the attitude of the aircraft. After the contents of the ping memory 402 have been read out, the positions of switches 403 and 404 are again reversed and ping memory 402 is loaded while pong memory 401 is read out.

Figure 18:
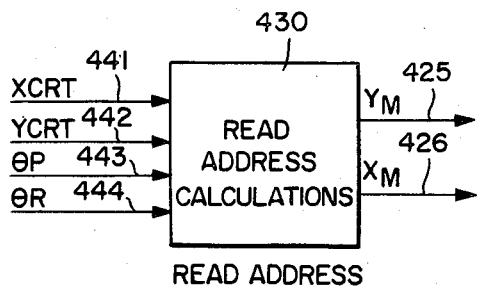
FIG. 18 is a generalized block diagram of read out address circuitry for accessing the ping-pong screen memory arrangement of FIG. 15 during the read mode.

FIG. 18 shows a generalized block diagram of the read address generation circuitry to be described in detail below. In its generalized form of FIG. 18, the read address generation circuitry 430 is shown as having its outputs supplied to the row and column address links 425 and 426 for ping-pong memories 402 and 401, as described above in connection with the write address circuitry FIG. 16. During the write mode, the values of the address signals on links 425 and 426 are generated in response to the line buffer clock signals and field identification signals described above in conjunction with FIGS. 1–14. For reading out the contents of the screen memory, however, the address signals are generated in response to attitude signals from the aircraft's guidance system and in accordance with signals from the scanning circuitry of the display CRT. The vertical and horizontal scanning signals from the CRT scanning circuitry are supplied over links 441 and 442 to read address generator 430. Link 443 provides a signal indicative of the pitch of the aircraft, while link 444 provides a signal indicative of the roll of the aircraft, each of these links carrying a digital code representative of the angle the aircraft makes with respect to level flight. This will be described in more detail below.

Figure 19:
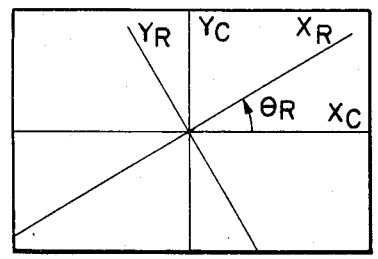
FIG. 19 shows the relative rotation of sets of axes for a CRT display screen memory for a roll of the aircraft through an angle $\theta_R$.

Before describing in detail the components of the read address generation circuitry, the functional purpose of this circuitry for controlling the position of the respective data on the display CRT will be explained. Basically, the circuitry operates to map the coordinates of the CRT display into the coordinates of the ping-pong field memories 402 and 401 in response to various roll and pitch maneuvers of the aircraft. Roll of the perspective image is carried out by rotation of the coordinates of the CRT display about an origin at the center of the display screen. The respective X and Y axes of the attitude of the aircraft under the influence of a roll maneuver form an angle data $\theta_R$ with respect to the axes of the aircraft in level flight corresponding to the axes $X_c Y_c$ of the CRT display, as shown in FIG. 19. In FIG. 19, the rotated set axes $X_R$, $Y_R$ represents the rotation of the image to be seen by the pilot/observer for a clockwise roll of the aircraft of an angle data $R$ relative to level flight. Namely, as mentioned above, the image always rolls in a direction opposite to that of the roll of the aircraft. To locate a position in a screen memory which corresponds to a roll position of the CRT display screen, the standard equations for rotation are employed as follows:

$$X_R = Y_c \sin \theta_R + X_c \cos \theta_R$$

$$Y_R = Y_c \cos \theta_R - X_c \sin \theta_R.$$

As mentioned above, the present invention also takes into account the pitch of the aircraft. For a change in attitude creating a pitch from level flight (nose-up or nose-down), there may be defined a pitch angle $\theta_P$ that will be used to modify the rotated coordinates $X_R$ and $Y_R$ defined above to provide a set of address values $X_A$ and $Y_A$ whose origin is located at column row positions 0, 0 in the screen memory. The manner in which the pitch values are generated will be described subsequently.

Since the origin of the CRT field memory is at the center of screen, it is located at column/row coordinates (120, 120). This means that a value of +120 has to be added to the pitch translated coordinates $X_A$ and $Y_A$ for proper transformation from the CRT display screen to the field memory. Thus, considering the total translation that must be carried out, to compensate for roll and pitch of the aircraft and the fact that aircraft attitude is defined relative to the center of the display, then one may derive the following expressions:

$$X_c \rightarrow \text{roll} \rightarrow X_R \rightarrow \text{pitch} \rightarrow X_A \rightarrow +120 \rightarrow X_M$$

$$Y_c \rightarrow \text{roll} \rightarrow Y_R \rightarrow \text{pitch} \rightarrow Y_A \rightarrow +120 \rightarrow Y_M.$$

As pointed out above, equations for rotation or roll of the aircraft are straightforward trigonometric expressions. Similarly, translating the coordinate positions of the CRT field memory to the center of the screen simply requires an addition of values representative of the offset from (0,0) to the center of the screen (here the values (120, 120) because of the fact that the memory is a 240 by 240 matrix). The manner in which the pitch adjustment correction is achieved may be understood by reference to FIGS. 20 and 21 to be described below.

Figure 20:
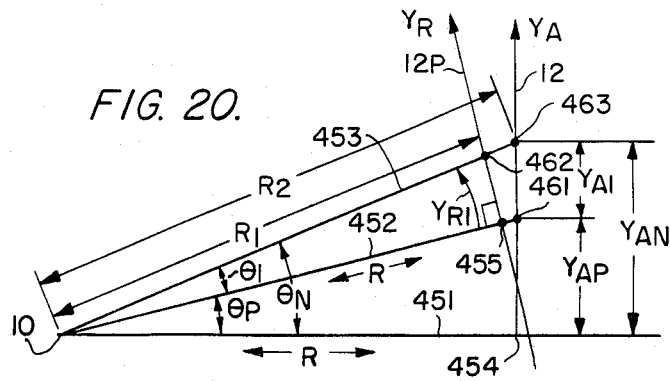
FIGS. 20 and 21 are respective graphical illustrations of the vertical and horizontal trigonometric relationships between an observer and a cockpit display screen for a change in pitch of the aircraft through an angle $\theta_P$.

FIG. 20 depicts, graphically, the trigonometric relationships between the point of observation of the observer at 10 and the normal perpendicular plane of the cockpit display screen 12, described previously, and the pitched plane 12P of that screen for a change in pitch of the aircraft through some pitch angle $\theta_P$. Namely, plane 12 represents the image plane of the cathode-ray tube display screen during level flight conditions, described above in accordance with the basic embodiment of the invention, which plane is separated by distance R from the point 10 of observation of the observer. The value of the pitch angle $\theta_P$ of the aircraft of a level flight condition is 0. For a positive pitch attitude of the aircraft, namely for a nose-up condition, the value of the pitch angle $\theta_P$ will represent some positive acute angle relative to level flight. Under these conditions, the separation between the point of observation 10 of the observer and the pitched plane of the display screen 12P remains the same value R but the infinite horizon line of sight changes from line 451, which intersects screen plane 12 at point 454, to line 452 which intersects the pitched plane 12P at point 455. Line 452 also intersects plane 12, which point represents the intersection of a ray from the observer onto the image plane 12 of data values which are actually stored in the ping-pong memories, as described previously. For any line of observation from the point of the observer at 10 to a location on the pitched viewing screen 12P due to a pitched attitude of the aircraft, along a line 453, there will be a point 462 of intersection at pitched image plane 12P and a point of intersection on the image plane 12 at point 463 corresponding to the stored values of data in the screen memories. Line of observation 453 makes an acute angle $\theta_1$ relative to infinite horizon line 452. Thus, relative to the normal infinite horizon line 451 which intersects the stored perpendicular image plane 12, line of observation 453 is pitched at some angle $\theta_N$, where $\theta_N = \theta_P + \theta_1$.

Figure 21:
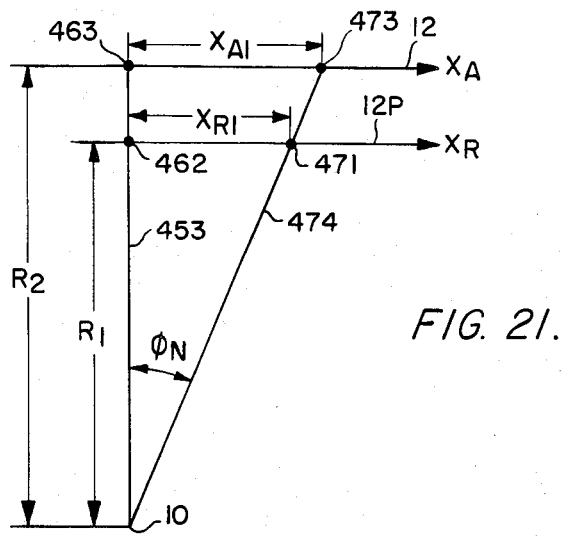

The scanning circuitry of the cockpit display CRT scans locations on the pitched imagine plane 12P, not the locations on the stored imagine plane 12. Accordingly, the objective of the trigonometric pitch conversion scheme illustrated graphically in FIGS. 20 and 21 is to convert points corresponding to the scanned CRT display screen 12P to memory locations in the stored screen memories so that the stored data can be accessed and presented at the proper locations on the display screen in the aircraft cockpit.

From the aircraft's guidance system, the pitch of the aircraft $\theta_P$ is provided and the scanning circuitry of the cockpit CRT supplies signals representative of the coordinates of the position of the scanning electron beam on the face of the CRT screen, namely the X and Y coordinates on image plane 12P. Simply put, known quantities are the pitch angle $\theta_P$ and the value $Y_{R1}$. The objective is to find the location of point 463 in the stored imagine plane so that the data thereat may be accessed and projected at point 462 on the pitched image plane. This is achieved as follows. Since R and $Y_{R1}$ are given, one may derive the equation $\tan \theta_1 = Y_{R1}/R$. The effective intersection of the infinite horizon line 452 at point 461 on the stored image screen 12 has an effective vertical separation of $Y_{AP}$ from normal infinite horizon line 451. $Y_{AP}$ may be derived as $$Y_{AP} = R \tan \theta_P.$$

Similarly, the location of the intersection of line of observation 453 at point 463 on the stored image plane has a value $Y_{AN}$ derived as:

$$Y_{AN} = R \text{ Tan } \theta_N = R \text{ Tan } (\theta_P + \theta_1).$$

Since $Y_{A1} = Y_{AN} - Y_{AP}$ then $Y_{A1}$ may be defined as:

$$Y_{A1} = R \text{ Tan } (\theta_P + \theta_1) - R \text{ Tan } \theta_P.$$

Since $\theta_1 = \text{Arctan } Y_{R1}/R$, it can be seen that the location of point 463, namely the value $Y_{A1}$ on the stored memory plane 12, which is to be accessed and reproduced on the pitched image plane 12P, is represented simply in terms of a trigonometric algorithm of known quantities. The circuitry through which the algorithm for the quantity $Y_{A1}$ in accordance with the above equation is implemented will be described below in connection with FIGS. 23-27. Before describing that implementation, however, it is useful to consider the location of the horizontal component of a respective pixel location on the pitched image plane.

Referring to FIG. 21, line 453 represents a line from the observer at point 10 which is perpendicular to a line in the plane of both the pitched image screen 12P and the stored image plane 12 and which is coplanar with some line of observation 474 that intersects pitched image 12P at point 471 and stored image plane 12 at point 473. The objective in this case is to locate the horizontal component $X_{A1}$ of point 473 in the stored image plane 12 that will be translated into point 471 which is separated from line 453 by distance $X_{R1}$ in the pitched image plane 12P. The vertical distance of both points 463 and 473 is the same, as shown in FIG. 20, discussed above.

Now, similar to the case of the determination of the vertical component or Y component of the stored data in the screen memory, here the aim is to locate the horizontal component $X_{A1}$ that will produce a data value at point 471 in the pitched image plane 12P. From the graphical representation shown in FIG. 21, the horizontal or X value of point 471 relative to point 462, which is located at the center of the display screen, may be represented in terms of an acute angle $\phi_N$ that line of observation 474 makes with a line from the observer 10 to the center of the screen. Thus, the horizontal or column value of point 471 as defined by the value of $X_{R1}$ may be defined as:

$$X_{R1} = R_1 \text{ Tan } \phi_N.$$

The magnitude of R1 depends upon the pitch of the aircraft and the particular line of observation relative to the pitch of the aircraft namely the cosine of $\theta_1$. Accordingly, $$R1 = R/\cos \theta_1.$$

Using the above expressions, the separation $X_{R1}$ may be defined as:

$$X_{R1} = R \text{ Tan } \phi_N/\cos \theta_1.$$

This expression may be written as $$R \text{ Tan } \phi_N = X_{R1} \cos \theta_1.$$

Referring again to FIG. 21, the location of point 473 on the stored image plane 12 may be defined in terms of angle $\phi_N$ and the separation distance R2 from the observer to the effective location on the stored image plane, namely $$X_{A1} = R_2 \text{ Tan } \phi_N.$$

The value R2 may be defined in terms of the pitch of the aircraft and the line of observation of interest, namely the total value $\theta_N$ or $$R_2 = R/\cos \theta_N.$$

From this and the foregoing expression one obtains:

$$X_{A1} = R \text{ Tan } \phi_N/\cos \theta_N.$$

Therefore, the location of point 471 may be written as:

$$X_{A1} = X_{R1} \cos \theta_1/\cos \theta_N.$$

As mentioned previously, the read address calculation circuitry carries out a roll→pitch→screen centering translation sequence in order to access from the screen memory a pixel intensity signal for the proper location of the cockpit display screen in accordance with the attitude of the aircraft. In the sequence, the roll correction is carried out first by the rotation correction circuitry shown schematically in FIG. 22.

This circuitry consists essentially of a set of counters 504 and 511, trigonometric multiplier memories or PROMs 513 and 514, and a downstream set of multipliers and adders. The interconnection and operation of the rotation correction circuitry shown in FIG. 22 will be best understood by describing how it generates the translated values for the $X_R$ and $Y_R$ components. To begin the processing of a field (odd or even) of interest, a value representative of the roll angle of the aircraft $\theta_R$, supplied over link 444 is coupled to a set of PROMs 513 and 514. Prom 513 is simply a lookup table from which the value $\sin \theta_R$ is derived, while PROM 514 is another lookup table from which the cosine value of the roll angle $\cos \theta_R$ is derived. The digital code representative of the value $\sin \theta_R$ is supplied over line 515 as one input of each of multipliers 521 and 523. Similarly, a code representation of the value $\cos \theta_R$ is supplied over link 516 to multipliers 522 and 524. These code values on respective links 515 and 516 are applied to the Y inputs of multipliers 521-524 and are clocked into input registers of these multipliers in response to a field clock supplied over link 501. A field load signal supplied over line 502 loads a value supplied over link 503 (here a code indicative of the value +120) into the $Y_c$ downcounter 504. At the beginning of a line, this downcounter 504 is decremented in response to a line clock signal 506. At the same time an $X_c$ upcounter 511 is load with the value −120 supplied over link 507. Then, for each pixel clock of a horizontal line supplied over link 512, the $X_c$ upcounter 511 is incremented by one. Thus, at the beginning of the first line of a field, the $Y_c$ downcounter is set at the value +120 and the $X_c$ upcounter is set at the value −120. The first pixel clock then loads the $X_c$ count which is supplied over link 522 to the X inputs of multipliers 522 and 523 into registers that are connected to these ports. Similarly, it loads the contents of $Y_c$ downcounter 504 which is coupled over link 505 to the X inputs of multipliers 521 and 524 into the registers that are connected to these ports. The first pixel clock increments the $X_c$ upcounter 511 such that the value $X_c = -119$. The next or second pixel clock then loads multipliers 522 and 523 with the next $X_c$ value and this process continues until 240 pixel clocks have been generated. At this time, the value of the $X_c$ up counter is $+119$.

At the start of the second line, the value $Y_c = +119$ and the value $X_c = -120$. The above process is repeated until all 240 lines have been processed.

Multipliers 521–524 operate to multiply the values that are supplied to their X and Y input ports and produce product codes over output links 531–534. Namely, for any value $X_c$ and $Y_c$, the output of multiplier 521 is $Y_c \sin \theta_R$ and the output of multiplier 522 is the value $X_c \cos \theta_R$. Adding these two output values on lines 531 and 532 in adder 541 produces the roll X correction $X_R = Y_c \sin \theta R + X_c \cos \theta_R$.

Multiplier 523 is programmed to output to the 2's complement of its product so that the output of multiplier 523 is $-X_c \sin \theta_R$. The output of multiplier 524 is a code corresponding to the value $Y_c \cos \theta_R$, so that adding the products supplied by multipliers 523 and 524 on links 533 and 534 in adder 542 produces an output code on link 544 $Y_R = Y_c \cos \theta_R - X_c \sin \theta_R$.

Using the rotation coordinate code values $X_R$ and $Y_R$ derived by the rotation correction circuitry of FIG. 22, pitch correction values are then produced in accordance with the pitch correction circuitry a block diagram of which is shown in FIG. 23. In addition, the pitch correction circuitry adds into the resulting codes translation values for taking into account the fact that roll and pitch maneuvers take place relative to the center of the screen which corresponds to coordinate locations (120, 120) in the field memories 401, 402. Accordingly, the coordinate positions of respective data values in the field memories $X_M$, $Y_M$ may be represented by the expressions $$X_M = X_A + 120 = X_R \cos \theta_1 / \cos \theta_N + 120,$$

and $$Y_M = Y_A + 120 = R \ Tan \ (\theta_P + \theta_1) - R \ Tan \ \theta_P + 120.$$

Referring now to FIG. 23, the interconnection and operation of the components of the pitch correction circuitry for implementing the above equations will be described. At the beginning of a field (odd or even) a field pulse signal is applied over link 555 to clear a pair of registers 552 and 565. Line 555 is also applied to the control input of multiplexer 563 one input of which receives the code corresponding to the value $-120$ over line 507 and the other input of which is coupled over line 567 to the output of a complement circuit 566. The output of multiplexer 563 is coupled as one input to adder 564.

The input of register 552 is coupled to the output of a PROM 551 which receives the code corresponding to the roll-corrected value $Y_R$ produced by the roll correction circuitry of FIG. 22 over link 544. PROM 551 constitutes a lookup table which takes the arctangent of the value $Y_R/R$ mentioned above. The output of register 552 is coupled to another lookup table PROM 573 which produces an output corresponding to $\cos \theta_1$ and to one input of an adder 553. A second input of adder 553 is coupled over link 443 to the aircraft's attitude sensor circuitry which generates a code corresponding to the pitch angle of the aircraft $\theta_P$. With register 552 being initially cleared by a field pulse on line 555, the output of adder 553 is simply a code corresponding to the pitch angle 443, which code is coupled to register 554. On the first pixel clock that is supplied over line 512, this code is loaded into register 554. The contents of register 554 are coupled to a pair of lookup table circuits 561 and 575. Lookup table 561 constitutes a PROM which produces the value $R \ Tan \ \theta_N$, whereas lookup table circuit 575 constitutes a PROM which produces the value of $1/\cos \theta N$. PROM 561 produces an output code corresponding to the expression $R \ Tan \ \theta_P$ and on the next pixel clock on line 512 this value is loaded into register 562. Since, as mentioned above, the field pulse on line 555 causes multiplexer 563 to couple the code value $-120$ over link 507 to adder 564, the output of adder 564 is the value $(R \ Tan \ \theta_P - 120)$. This value is loaded into register R5 at the end of field pulse signal on line 555. The contents of register 565 are complemented by 2's complement circuit 566 and supplied as a second input to multiplexer 563 on link 567. Namely, link 567 carries the value $-R \ Tan \ \theta_P + 120$. This value is also coupled to counter 284 to set the address for the infinite horizon by the address calculation circuit to the line buffers, described above in conjunction with FIG. 14.

In the description to follow, the sequencing of operations that takes place in pitch correction circuit of FIG. 23 will be explained with reference to Table 1, shown in FIG. 24 which tabulates the pipeline action of the components of the pitch correction circuit of FIG. 23.

As mentioned previously, the sequence of operations that takes place calls for the roll correction values $X_R$, $Y_R$ generated in the circuitry of FIG. 22 to be supplied to the pitch correction circuit of FIG. 23. The $X_R$ value is supplied over link 543 to a register 572 while the $Y_R$ value is applied over link 544 to PROM 551. On the first pixel clock supplied over link 512, register 552 is loaded with the value $\theta_1$ as derived by PROM 551, as mentioned above. PROM 551 is programmed to compute $\theta_1 (1)$ from the known input $Y_{R1}$. The pitch angle value $\theta_P$ supplied over link 443 is added in adder 553 to the output of register 552 to provide an effective output $\theta_P + \theta_1 (1)$. On the next pixel clock on line 512, register 552 is loaded with a new incremental value $\theta_1 (2)$ which is derived by PROM 551 on the basis of a new $Y_R$ value $(Y_{R2})$ and the output of adder 553 is loaded into register 554. Thus, the contents of register 554 at this time are $\theta_{N1} = \theta_P + \theta_1 (1)$. On the next pixel on line 512, register 562 is loaded with the value computed by PROM 561 $(R \ Tan \ \theta_{N1})$. This pixel clock also loads registers 552 and 554 with their new values as shown in Table 1 (FIG. 24).

Since PROM 551 is programmed to calculate the value $\theta_1 = Tan^{-1} \ Y_R/R$, where $Y_R$ is the value calculated from the rotation circuit supplied over line 544, a new $Y_R$ value is calculated for each pixel clock such that there are 240 separate $Y_R (i)$ values, resulting in 240 $\theta_1$ values. The registers employed downstream of the calculation circuits allow the outputs of the calculation circuits to become stable when clocked. Thus, register 552 permits the output of PROM 551 to be stable when register 552 is clocked. The pitch angle value $\theta_P$ supplied over link 443 is summed in adder 553 with the contents of register 552 ($\theta_1$) so that adder 553 produces the output $\theta_N = \theta_P + \theta_1$. This result will be stable by the time the next pixel clock on line 512 loads that value into register 554. PROM 561 calculates the value $R \ Tan \ \theta_N$ and its output will be stable at the next pixel clock on line 512. This value is loaded into register R4 which supplies to adder 564 the value $R \ Tan \ \theta_N$ which is summed with the value $-120$ and stored in register 565 as mentioned above. The output of adder 564 will be stable at the next pixel clock and this value is stored in register 571, which is also coupled to receive the pixel clock on line 512. Thus, register 571 contains the value R Tan $\theta_P + \theta_1$ − R Tan $\theta_P + 120$.

From Table 1 it can be seen that it takes four pixel clocks from the beginning of the operation to derive the value $Y_M$ on link 425 at the output of register 571.

For the derivation of the $X_M$ values, the $X_R$ codes from the roll calculation circuit on line 543 is supplied to a register 572. Register 572 is clocked by the same pixel clock on line 512 that clocks the registers $Y_M$ calculations to insure that the $X_M$ and $Y_M$ values are in phase with one another. PROM 573 calculates cos $\theta_1$ and supplies its output as one input to a multiplier 574. Multiplier 574 multiplies this value by the contents of register 572 $X_R$ (i) to produce the product $X_R$ (i)·cos$\theta_1$ (i), which value will be stable upon the occurrence of the next pixel clock. This value in turn, is supplied as one input to a multiplier 576 which receives as its second input the output of a PROM 575, which calculates the value 1/cos $\theta_N$(i). Thus, the output of the multiplier 576 is the value $X_R$ (i)·cos$\theta_1$ (i)/cos $\theta_N$(i). This value is added in adder 577 with a code corresponding to the numerical value +120 or center screen location, as mentioned above.

When the next clock pulse on line 512, the output of adder 577 is loaded into register 578 so that register 578 contains the value $X_R$ (i)·cos$\theta_1$ (i)/cos$\theta_N$(i) + 120. From Table 2 (FIG. 25), it can be seen that it also takes four pixel clocks from the beginning of the operation to derive the value $X_M$ on line 426, just as it took four pixel clocks to derive the value $Y_M$ on line 425. These values $X_M$ and $Y_M$ are supplied to the field memories (FIG. 15) for reading out the contents thereof to be supplied to the cockpit display CRT.

It should be noted, however, that the $X_M$ and $Y_M$ values may fall outside of the CRT field memory so that a limit comparison operation, similar to that carried out for the basic embodiment of the invention must be provided. Specifically, the $X_M$ and $Y_M$ values must be checked for the limits according to the expression:

$$0 \leq (X_M \text{ or } Y_M) \leq 240.$$

If either the value $X_M$ or $Y_M$ is outside of these limits, the brightness value for the pixel displayed on the cockpit screen will be set such that a black dot will appear. This is accomplished by the circuitry shown in FIG. 26.

Figure 26:
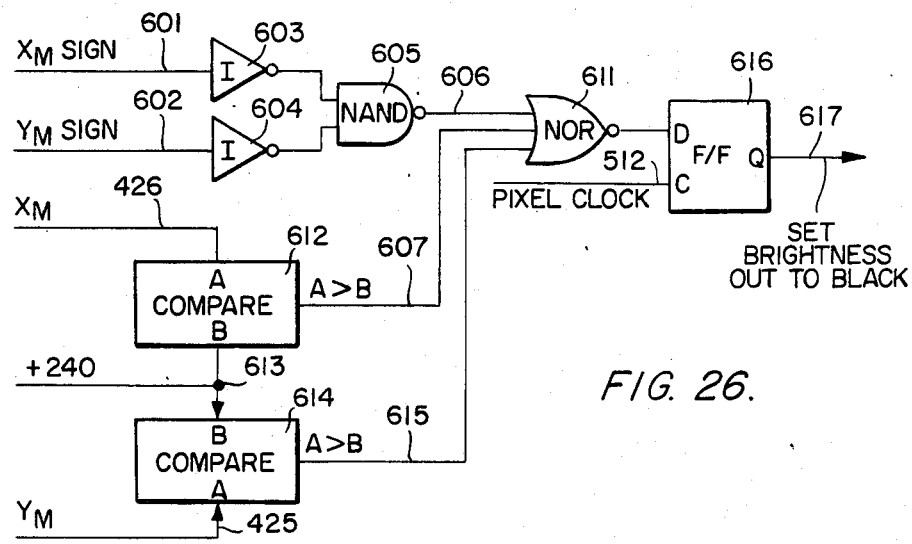
FIG. 26 is a schematic block diagram of a screen limits comparison circuit.

As shown in FIG. 26, the $X_M$ and $Y_M$ values are coupled over links 426 and 425 to the A inputs of respective comparators 612 and 614. The B inputs of these comparators receive a code over link 613 corresponding to the upper limit +240. The output of comparator 612 goes high if the value of $X_M$ exceeds the value +240 and the output of comparator 614 goes high if the value of $Y_M$ exceeds the upper limit +240. Otherwise, the outputs of each comparator over link 607 and 615, respectively, is low.

The signs of the coordinate values $X_M$, $Y_M$ are supplied over links 601, 602 through inverters 603, 604 to respective inputs of NAND gate 605, the output of which is coupled over link 606 as a third input of NOR gate 611. The output of NOR gate 611 is coupled to the D input of a clocked flip-flop 616, the clock input of which is the pixel clock over link 512. Since the $X_M$ and $Y_M$ values are encoded in 2's complement, the sign bit on either of links 601 and 602 is a "1" for any negative number. Accordingly, if either $X_M$ sign or $Y_M$ sign is a "1" the Q output of flip-flop 616 will be set to a "1" on the next pixel clock supplied over link 512. Similarly, if either value of $X_M$ or $Y_M$ is greater than +240, the output of the corresponding comparator 612 or 614 will be a "1", which will also cause the flip-flop 616 to be set to "1" on the next pixel clock. The Q output of flip-flop 616 is coupled over link 617 to cause the pixel of interest to have a value corresponding to a black dot.

In addition to the roll and pitch correction circuitry described shown in FIGS. 22 and 23, described above, the read out control circuitry of FIG. 18 may contain a nonlinear screen correction PROM to which the Xm and Ym coder on links 425 and 426 are coupled for mapping the CRT display locations onto a nonlinear, e.g. dome, image plane. Namely, in the embodiments described above, the image screen of interest was assumed to be planar. For achieving image projection in a non-planar surface (e.g. canopy dome) a look-up table of compensating or correction coder is prepared based upon the geometry of the display surface to be employed and the Xm, Ym coder generated by the roll-/pitch correction circuitry are used to access a pair of "dome"-corrected values (Xm', Ym') from the look-up table which, in turn, control the cockpit display so that the resulting projected image will not be distorted by the nonlinearities of the surface upon which it is projected.

As will be appreciated from the foregoing description, the present invention is capable of providing a perspective presentation of the terrain over which an aircraft is flying based upon elevation data stored in the form of a digital map through a simple trigonometric conversion scheme. By physically rotating the cockpit display unit 90°, the basic storage/buffer mechanism may be accomplished using a pair of line buffers. On the other hand, conventional ping-pong screen memories that afford the storage of a complete field of data, may be used and, as such, provide for adjustment of the projected image for a number of control variables including change in attitude (roll/pitch) and image screen nonlinearities (e.g. dome projection).

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use with a digital data base in whicha terrain map in the form of data representative of the elevation of said terrain over a prescribed geographical area is stored, a method of producing, on a display screen, a perspective image of said terrain to an observer comprising the steps of
   (a) storing, in addressable memroy locations of a memory, a portion of the digital data representing the elevation of said terrain over a portion of said geographical area such that, as stored in said memory, said terrain elevation representative data has a prescribed geographical orienatation;
   (b) establishing an elevation and viewing direction of an observer and, within the data stored in said memory, the geographical position of said observer as projected onto said terrain map;

(c) controllably accessing respective elevation data values stored in addressable memory locations of said memory which effectively correspond to points lying along a plurality of contour paths respectively radiating from an address corresponding to said geographical position and traversing said map;

(d) translating the points lying along said plurality of contour paths onto locations of said display screen in accordance with the effective intersections of a plurality of observation lines with a prescribed image window, said image window corresponding to the display screen as seen by said observer and having an effective elevation and geographical position on said terrain map determined in accordance with said elevation and viewing direction established for said observer, said observator lines extending from the effective elevation of said observer at the establishes geographical position thereof through said points lying along said plurality of contour paths on said terrain map; and (e) generating respective images of aid terrain at locations on said display screen as translated in step (d) corresponding to points lying along said plurality of contour paths on said terrain map in accordance with data accessed from said addressable memory locations of said memory in step (c).

2. A method according to claim 1, wherein step (e) comprises generating said respective images of said points in accordance with the slope of said terrain at said points.

3. A method according to claim 2, wherein step (e) comprises generating said respective images of said points in accordance with the effective degree of shading produced at said points by the slope of said terrain thereat relative to a prescribed illumination of said terrain.

4. A method according to claim 1, wherein said plurality of contour paths defines a predetermined field of view about a selected direction of observation from said observer on said terrain map.

5. A method according to claim 1, wherein step (d) comprises the steps of determining the respective terrain elevations of said points on said plurality of contour paths and establishing said translated locations on said display screen in accordance with a prescribed relationship between the differences between said effective elevation of said observer and said respective terrain elevations and the effective distances between said observer and each of said screen and said points.

6. A method according to claim 5, wherein data stored in said memory define the elevations for a matrix of geographical locations on said terrain map.

7. A method according to claim 6, wherein step (d) comprises interpolating the elevations of said respective points from the elevations of said matrix of geographical locations on said terrain map.

8. A method according to claim 7, wherein step (d) comprises interpolating the elevations of said terrain at a respective one of said points in accordance with the slope of said terrain thereat.

9. A method according to claim 8, wherein said slope of said terrain at said respective one of said points is defined in accordance with elevation data values of said matrix the geographical locations of which on said terrain map are adjacent to said respective one of said points.

10. A method according to claim 9, wherein said slope of said terrain at said respective one of said points is further defined in accordance with the geographical location of said respective one of said points relative to one of said adjacent geographical locations of said matrix.

11. A method according to claim 1, wherein said plurality of contour paths defines a predetermined field of view about a selected direction of observation from the location of said observer as projected onto said terrain map, and step (e) comprises generating respective images of said points in accordance with the effective degree of shading produced at said points by the slope of said terrain thereat relative to a prescribed illumination of said terrain from a predetermined direction relative to said selected direction of observation.

12. A method according to claim 11, wherein said predetermined direction is orthogonal to said selected direction of observation.

13. A method according to claim 1, wherein the data stored in said memory is updated in accordance with information representative of the change of position of said observer relative to said terrain.

14. A method according to claim 13, wherein said information representative of the change of position of said observer corresponds to the relative movement between said observer and said terrain and said data is representative of points of said terrain as contained within the field of view of said observer based upon the relative movement of said observer and said terrain.

15. A method according to claim 14, wherein said digital data base is adapted for use with a vehicle for travelling over said terrain and in which said observer and display screen are to be situated, and wherein said information representative of the change of position of said observer corresponds to the travel of said vehicle over said terrain.

16. A method according to claim 15, wherein said plurality of contour paths defines a predetermined field of view of said observer about the direction of travel of said vehicle, and step (e) comprises generating respective images of said points in accordance with the effective degree of shading produced at said points by the slope of said terrain relative to a prescribed illumination of said terrain from a predetermined direction relative to said direction of travel.

17. A method according to claim 1, wherein step (d) comprises sequentially identifying a plurality of points on said terrain map along each of said plurality of contour paths and translating selected ones of said plurality of points along a respective one of said contour paths onto successive pixel locations that lie along a respective vertical line, as viewed by said observer, on said display screen.

18. A method according to claim 17, wherein the locations of points on a respective $i^{th}$ one of said contour paths are interleaved with respect to the locations of points on a respective $(i+1)^{th}$ one of said contour paths.

19. A method according to claim 18, wherein a selected one of the plurality of points on said terrain map along a respective one of said contour paths corresponds to a point on said terrain map a respective second line from the position of said observer through which effectively intersects a pixel position of said display screen.

20. A method according to claim 19, wherein step (d) comprises interpolating the elevations of said terrain at a respective one of said points in accordance with the slope of said terrain thereat.

21. A method according to claim 20, wherein data stored in said memory define the elevations for a matrix of geographical locations on said terrain map.

22. A method according to claim 21, wherein said slope of said terrain at said respective one of said points is defined in accordance with elevation data values of said matrix the geographical locations of which on said terrain map are adjacent to said respective one of said points.

23. A method according to claim 22, wherein said slope of said terrain at said respective one of said points is further defined in accordance with the geographical location of said respective one of said points relative to one of said adjacent geographical locations of said matrix.

24. A method according to claim 19, wherein said plurality of contour paths defines a predetermined field of view about a selected direction of observation from said observer on said terrain map, and step (e) comprises generating respective images of said points in accordance with the effective degree of shading produced at said points by the slope of said terrain thereat relative to a prescribed illumination of said terrain from a predetermined direction relative to said selected direction of observation.

25. A method according to claim 17, wherein step (e) comprises storing pixel intensity information for successive pixels lying along a respective vertical line of said display screen for each respective contour paths, points along which have been translated into vertical pixel locations on said display screen in step (d) and coupling said pixel intensity information to said successive pixels.

26. A method according to claim 25, wherein step (e) comprises storing pixel intensity information for successive pixels lying along a respective $i^{th}$ vertical line of said display screen corresponding to an $i^{th}$ one of said contour paths, and coupling pixel intensity information to successive pixels along a respective $(i-1)^{th}$ vertical line on said display screen corresponding to an $(i-1)^{th}$ one of said contour paths.

27. A method according to claim 1, wherein step (e) comprises producing said respective images in accordance with the attitude of said display screen relative to a predetermined attitude.

28. A method according to claim 15, wherein step (e) comprises generating said respective images in accordance with the attitude of said vehicle in which said display screen is situated relative to a predetermined attitude of said vehicle.

29. A method according to claim 28, wherein said attitude includes the roll of said vehicle.

30. A method according to claim 28, wherein said attitude includes the pitch of said vehicle.

31. A method according to claim 28, wherein said attitude includes the roll and the pitch of said vehicle.

32. A method according to claim 1, wherein step (e) includes generating said respective images in accordance with the shape of said display screen.

33. For use with a terrain map storage device containing a digital data base in which a terrain map in the form of data representative of the elevation of said terrain over a prescribed geographical area is stored, an apparatus generating display information that is to be coupled to a display device for producing, on a dispaly screen, a perspective image of said terrain to an observer comprising:

memory means for storing, in addressable memory locations thereof, a portion of the digital data representing the elevation of terrain over a portion of said geographical area such that, as stored in said memory means, said terrain elevation representative data has a prescribed geographical orientation;

first means for controllably accessing respective elevation data values stored in addressable memory locations of said memory means for a plurality of points on said terrain map along each of a plurality of contour paths, said contour paths respectively radiating from an address corresponding to the geographical position of said observer as projected onto and traversing said terrain map from an established elevation and viewing direction of said observer;

second means, coupled to said first means and to said memory means, for generating, for points on respective ones of said contour paths on said terrain map, display screen pixel location signals representative of successive pixel locations on said display screen that lie along respective vertical lines associated with a translation of points lying along said plurality of contour paths on to locations on said display screen in accordance with the effective intersections of a plurality of observation lines with a prescribed image window, said image window corresponding to the display screen as seen by said observer and having an effective elevation and geographical position on said terrain map determined in accordance with said elevation and viewing direction established for said observer, said observation lines extending from the effective elevation of said observer at the established geographical position thereof through said points lying along said plurality of contour paths on said terrain map, so that said vertical lines as viewed by said observer on said display screen, effectively conincide with respective ones of said first lines; and third means, coupled to said first and second means, for generating respective terrain image - representative pixel intensity locations for each of said display screen pixel location signals generated by said second means in accordance with respective elevation data values accessed from said memory means by said first means.

34. An apparatus according to claim 33, wherein said third means includes means for generating signals representative of the slope of said points on said terrain map, and means for generating a respective pixel intensity signal in accordance with the slope of the terrain at the point for which a respective display screen pixel location signal has been generated.

35. An apparatus according to claim 34, wherein said third means includes means for generating a respective pixel intensity signal in accordance with the effective degree of shading produced at said point by the slope of the terrain thereat relative to a prescribed illumination of said terrain.

36. An apparatus according to claim 33, wherein second means comprises means for determining the respective terrain elevations of said points on said on said plurality of contour paths and generating said display screen pixel location signals in accordance with a prescribed relationship between the differences between the effective elevation of said observer and said respective terrain elevations and the effective distances between said observer and each of said screen and said points.

37. An apparatus according to claim 36, wherein said second means includes means for interpolating the elevation of said terrain at a respective one of said points in accordance with the slope of the terrain thereat.

38. An apparatus according to claim 33, wherein said plurality of first lines defines a predetermined field of view about a selected direction of observation from said observer on said terrain map, and said third means includes means for generating respective pixel intensity signals for said points in accordance with the effective degree of shading produced at said points by the slope of the terrain thereat relative to a prescribed illumination of said terrain from a predetermined direction relative to said selected direction of observation.

39. An apparatus according to claim 38, wherein said terrain map storage device is adapted for use with a vehicle for travelling over said terrain and in which said observer and said display screen are to be situated, and wherein the direction of travel of said vehicle corresponds to said selected direction of observation.

40. An apparatus according to claim 33, wherein said third means includes means for storing respective pixel intensity signals for successive pixels lying along a respective vertical line of said display screen for each respective contour path, and wherein said apparatus further includes fourth means, coupled to said third means, for coupling said pixel intensity signals to said display screen.

41. An apparatus according to claim 40, wherein said third means includes means for storing pixel intensity signals for successive pixels lying along a respective $i^{th}$ vertical line of said display screen corresponding to an $i^{th}$ one of said contour paths, and said fourth means comprises means for coupling pixel intensity signals to successive pixels along a respective $(i-1)^{th}$ vertical line of said display screen corresponding to an $(i-1)^{th}$ one of said contour paths.

42. An apparatus according to claim 33, wherein data stored in said memory means define the elevations for a matrix of geographical locations on said terrain map.

43. An apparatus according to claim 42, wherein said second means includes means for interpolating the elevations of said respective points from the elevations of said matrix of geographical locations on said terrain map.

44. An apparatus according to claim 43, wherein said second means includes means for interpolating the elevations of said terrain at a respective one of said points in accordance with the slope of said terrain thereat.

45. An apparatus according to claim 44, wherein said slope of said terrain at said respective one of said points is defined in accordance with elevation data values of said matrix the geographical locations of which on said terrain map are adjacent to said respective one of said points.

46. An apparatus according to claim 45, wherein said slope of said terrain at said respective one of said points is further defined in accordance with the geographical location of said respective one of said points relative to one of said adjacent geographical locations of said matrix.

47. An apparatus according to claim 33, wherein said terrain map storage device includes means for updating the data stored in said memory means in accordance with information representative of the change of position of said observer relative to said terrain.

48. An apparatus according to claim 47, wherein said information representative of the change of position of said observer corresponds to the relative movement between said observer and said terrain and said data is representative of points of said terrain as contained within the field of view of said observer based upon the relative movement of said observer and said terrain.

49. An apparatus according to claim 48, wherein said terrain map storage apparatus is adapted for use with a vehicle for travelling over said terrain and in which said observer and display screen are to be situated, and wherein said information representative of the change of position of said observer corresponds to the travel of said vehicle over said terrain.

50. An apparatus according to claim 49, wherein said plurality of contour paths defines a predetermined field of view of said observer about the direction of travel of said vehicle, and said third means includes means for generating respective pixel intensity signals associated with said points in accordance with the effective degree of shading produced at said points by the slope of said terrain relative to a prescribed illumination of said terrain from a predetermined direction relative to said direction of travel.

51. An apparatus according to claim 33, wherein the locations of points on a respective $i^{th}$ one of said contour paths are interleaved with respect to the locations of points on a respective $(i+1)^{th}$ one of said contour paths.

52. An apparatus according to claim 33, wherein said third means includes means for generating said respective terrain image - representative pixel location signals in accordance with the attitude of said display screen relative to a predetermined attitude.

53. An apparatus according to claim 33, wherein said third means includes means for generating said respective terrain image - representative signals in accordance with the shape of said display screen.

54. An apparatus according to claim 39, wherein said third means comprises correction means for generating said respective terrain-image representative pixel signals in accordance with the attitude of said vehicle in which said display screen is situated relative to a predetermined attitude of said vehicle.

55. An apparatus according to claim 54, wherein said attitude includes the roll of said vehicle.

56. An apparatus according to claim 54, wherein said attitude includes the pitch of said vehicle.

57. An apparatus according to claim 54, wherein said attitude includes the roll and pitch of said vehicle.

58. An apparatus according to claim 54, wherein said correction means includes additional memory means for storing respective terrain-image representative pixel signals generated in accordance with said predetermined attitude of said vehicle, and means for controllably reading out said pixel signals in accordance with said attitude of said vehicle.

59. An apparatus according to claim 58, wherein said attitude includes the roll and pitch of said vehicle.

60. An apparatus according to claim 58, wherein said controllably reading out means comprises means for accessing the contents of said additional memory in accordance with successive roll and pitch corrections representative of the attitude of said vehicle relative to said predetermined attitude.

61. A method according to claim 4, wherein said selected direction of observation is rotated with respect to said prescribed geographical orientation.

62. An apparatus according to claim 38, wherein said selected direction of observation is rotated with respect to said prescribed geographical orientation.

* * * * *